US012323737B2

(12) United States Patent
Kasaba

(10) Patent No.: US 12,323,737 B2
(45) Date of Patent: Jun. 3, 2025

(54) SYSTEM AND METHOD FOR AN INTERACTIVE DIGITALLY RENDERED AVATAR OF A SUBJECT PERSON

(71) Applicant: KNOW SYSTEMS CORP, Middletown, DE (US)

(72) Inventor: Michael E. Kasaba, Malibu, CA (US)

(73) Assignee: KNOW SYSTEMS CORP, Middletown, DE (US)

( * ) Notice: Subject to any disclaimer, the term of this patent is extended or adjusted under 35 U.S.C. 154(b) by 622 days.

(21) Appl. No.: 17/581,690

(22) Filed: Jan. 21, 2022

(65) Prior Publication Data
US 2022/0150448 A1    May 12, 2022

Related U.S. Application Data

(63) Continuation-in-part of application No. 17/410,369, filed on Aug. 24, 2021, now Pat. No. 11,303,851.
(Continued)

(51) Int. Cl.
*H04N 7/15*      (2006.01)
*G06F 3/01*      (2006.01)
(Continued)

(52) U.S. Cl.
CPC ............. *H04N 7/157* (2013.01); *G06F 3/017* (2013.01); *G06N 20/00* (2019.01); *G06V 40/174* (2022.01); *G06V 40/28* (2022.01); *G09B 5/14* (2013.01)

(58) Field of Classification Search
CPC ........... H04N 1/42; H04N 7/14; H04N 7/141; H04N 2007/145; H04N 7/152;
(Continued)

(56) References Cited

U.S. PATENT DOCUMENTS 8,285,549 B2    10/2012    Teegan et al.
9,058,698 B2     6/2015    Jones et al.
(Continued)

FOREIGN PATENT DOCUMENTS

EP            2849087 A1    3/2015
KR    10-2018-0093455 A    8/2018
(Continued)

OTHER PUBLICATIONS

International Search Report and Written Opinion mailed Mar. 7, 2022 for International application No. PCT/US2021/058423.

*Primary Examiner* — Maria El-Zoobi
(74) *Attorney, Agent, or Firm* — Plumsea Law Group, LLC

(57) ABSTRACT

A system and method for an interactive digitally rendered avatar of a subject person during a video presentation is described. In one embodiment, the method includes transmitting a video presentation featuring a subject person to a plurality of users via a first communication format. The method also includes receiving from at least one user of the plurality of users during the video presentation, a request to initiate an interactive session with an avatar of the subject person. In response to the request, the method includes generating a first avatar of the subject person and initiating a first interactive session between the first avatar and the at least one user. The method further includes engaging in the first interactive session between the first avatar of the subject person and the at least one user via a second communication format that is different than the first communication format.

16 Claims, 21 Drawing Sheets

Related U.S. Application Data which is a continuation of application No. 17/094,146, filed on Nov. 10, 2020, now Pat. No. 11,140,360.

(51) Int. Cl.
*G06N 20/00* (2019.01)
*G06V 40/16* (2022.01)
*G06V 40/20* (2022.01)
*G09B 5/14* (2006.01)

(58) Field of Classification Search
CPC ........ H04N 7/147; H04N 7/157; G06N 20/00; G06F 3/017; G06K 9/00302; G06K 9/00355; G09B 5/14
See application file for complete search history.

(56) References Cited

U.S. PATENT DOCUMENTS

| | | | |
|---|---|---|---|
| 9,318,113 B2 | 4/2016 | Westby et al. | |
| 9,608,950 B2 | 3/2017 | Geiger et al. | |
| 9,613,450 B2 | 4/2017 | Wang et al. | |
| 9,716,674 B2 | 7/2017 | Ciofalo et al. | |
| 9,959,368 B2 | 5/2018 | Kolluru et al. | |
| 9,965,553 B2 | 5/2018 | Lyren | |
| 9,996,963 B2 | 6/2018 | Ray et al. | |
| 10,139,917 B1 | 11/2018 | Nariyawala et al. | |
| 10,169,897 B1 | 1/2019 | Geiger et al. | |
| 10,275,121 B1 | 4/2019 | Geiger et al. | |
| 10,291,669 B2 | 5/2019 | Dharmaji | |
| 10,313,403 B2 | 6/2019 | Ciofalo et al. | |
| 10,362,219 B2 | 7/2019 | Wilson et al. | |
| 10,523,898 B1 | 12/2019 | Ward | |
| 10,628,635 B1 | 4/2020 | Carpenter, II et al. | |
| 10,679,626 B2 | 6/2020 | Aarabi | |
| 10,706,347 B2 | 7/2020 | Garcia | |
| 10,853,717 B2 | 12/2020 | Abramson et al. | |
| 11,140,360 B1 | 10/2021 | Kasaba | |
| 2002/0010584 A1 | 1/2002 | Schultz et al. | |
| 2007/0165022 A1 | 7/2007 | Peleg et al. | |
| 2009/0112680 A1 | 4/2009 | Dovrath et al. | |
| 2009/0298039 A1* | 12/2009 | Glazier | G09B 7/08 434/362 |
| 2011/0007079 A1 | 1/2011 | Perez et al. | |
| 2011/0225498 A1 | 9/2011 | Goldman et al. | |
| 2013/0257876 A1 | 10/2013 | Davis | |
| 2013/0257877 A1 | 10/2013 | Davis | |
| 2014/0006326 A1* | 1/2014 | Bazanov | G06N 5/02 706/46 |
| 2015/0121215 A1 | 4/2015 | Wohlert et al. | |
| 2016/0134840 A1 | 5/2016 | McCulloch | |
| 2017/0018200 A1 | 1/2017 | Nemire et al. | |
| 2017/0206795 A1 | 7/2017 | Kaleal, III | |
| 2017/0206797 A1 | 7/2017 | Solomon et al. | |
| 2018/0018507 A1* | 1/2018 | Chetlur | G09B 5/12 |
| 2018/0061254 A1 | 3/2018 | Amigud | |
| 2018/0350144 A1 | 12/2018 | Rathod | |
| 2018/0359293 A1 | 12/2018 | Faulkner et al. | |
| 2019/0051032 A1 | 2/2019 | Chu et al. | |
| 2019/0266774 A1 | 8/2019 | Sommerlade et al. | |
| 2019/0333094 A1 | 10/2019 | Newell et al. | |
| 2020/0306640 A1 | 10/2020 | Kolen et al. | |
| 2021/0019982 A1 | 1/2021 | Todd | |
| 2021/0295579 A1 | 9/2021 | Davis | |

FOREIGN PATENT DOCUMENTS

| | | |
|---|---|---|
| KR | 10-1925440 B1 | 12/2018 |
| KR | 102035596 B1 | 10/2019 |
| WO | 2019036569 A1 | 2/2019 |

* cited by examiner

SYSTEM AND METHOD FOR AN INTERACTIVE DIGITALLY RENDERED AVATAR OF A SUBJECT PERSON

CROSS-REFERENCE TO RELATED APPLICATIONS

This application is a continuation-in-part of and claims benefit to U.S. patent application Ser. No. 17/410,369, filed on Aug. 24, 2021 and titled "System and Method for an Interactive Digitally Rendered Avatar of a Subject Person", which application is a continuation of and claims benefit to U.S. patent application Ser. No. 17/094,146, filed on Nov. 10, 2020 and titled "System and Method for an Interactive Digitally Rendered Avatar of a Subject Person", the disclosures of which applications are incorporated by reference herein in their entirety.

BACKGROUND

The present disclosure generally relates to using an artificial intelligence system to digitally render an avatar of a subject person, and in particular, to using a digitally rendered avatar of a subject person to interact with one or more users.

Technology and social media has greatly expanded the ability of people to engage and interact with other people from all over the world through text, audio, and video. However, this expanded audience also causes issues with being able to engage in one-on-one conversations or interactions with people who are particularly popular. For example, celebrities and other notable persons (such as politicians, athletes, etc.) may have many millions of followers. It is not practical or feasible in these cases for the celebrity or notable person to be able to interact with so many people on an individualized basis.

There is a need in the art for a system and method that provides increased access that allows for more individual interactions between people.

SUMMARY OF THE INVENTION

A system and method for providing an interactive digitally rendered avatar of a subject person is described herein.

In one aspect, a method of detecting feedback from a plurality of users during a group presentation by a subject person is provided. The method includes transmitting a video of the group presentation featuring the subject person to the plurality of users via a first communication format and detecting from a user interface of at least one user of the plurality of users during the group presentation, feedback from the at least one user during the group presentation. Detecting the feedback from the at least one user during the group presentation includes capturing an input made by the at least one user during the group presentation through the user interface that includes one of a gesture, a facial expression, or body language made by the at least one user. The method also includes collecting each detected feedback from the at least one user detected during the group presentation, and, upon completion of the group presentation, providing a summary of the collected feedback to the at least one user.

In another aspect, a method of providing an interactive digital avatar of a subject person during a tutoring session to a user is provided. The method includes transmitting a video of a group presentation featuring a subject person to a plurality of users via a first communication format and detecting from a user interface of at least one user of the plurality of users during the group presentation, feedback from the at least one user during the group presentation. Detecting the feedback from the at least one user during the group presentation includes capturing an input made by the at least one user during the group presentation through the user interface that includes one of a gesture, a facial expression, or body language made by the at least one user. Upon completion of the group presentation, the method includes providing a feedback summary of the detected feedback from the at least one user to the at least one user via the user interface and generating a tutoring session between the at least one user and an interactive avatar of the subject person. The tutoring session is based on the feedback summary of the at least one user and the tutoring session is conducted via a second communication format that is different than the first communication format.

In still another aspect, a system for providing an interactive digital avatar of a subject person during a tutoring session to a user is provided. The system includes a communication interface allowing communication with a plurality of users and an artificial intelligence engine in communication with the communication interface. The artificial intelligence engine includes at least one processor, a memory, and storage for computer-readable instructions that, when executed by the at least one processer, cause the at least one processor to: transmit, via the communication interface, a group presentation featuring a subject person to the plurality of users via a first communication format and detect from a user interface of at least one user of the plurality of users during the group presentation, feedback from the at least one user during the group presentation. Detecting the feedback from the at least one user during the group presentation includes capturing an input made by the at least one user during the group presentation through the user interface that includes one of a gesture, a facial expression, or body language made by the at least one user. Upon completion of the group presentation, the instructions further cause the at least one processor to provide a feedback summary of the detected feedback from the at least one user to the at least one user via the user interface and generate a tutoring session between the at least one user and an interactive avatar of the subject person. The tutoring session is based on the feedback summary of the at least one user and the tutoring session is conducted via a second communication format that is different than the first communication format.

In another aspect, a method of providing an interactive digital avatar of a subject person during a video presentation is provided. The method includes transmitting a video presentation featuring a subject person to a plurality of users via a first communication format. The method also includes receiving from at least one user of the plurality of users during the video presentation, a request to initiate an interactive session with an avatar of the subject person. In response to the request, the method includes generating a first avatar of the subject person and initiating a first interactive session between the first avatar and the at least one user. The method further includes engaging in the first interactive session between the first avatar of the subject person and the at least one user via a second communication format that is different than the first communication format.

In another aspect, a system for providing an interactive digital avatar of a subject person during a video presentation is provided. The system includes a communication interface allowing communication with one or more users of a plurality of users. The system also includes an artificial intelligence engine in communication with the communication interface. The artificial intelligence engine including at least one processor, a memory, and storage for computer-readable instructions that, when executed by the at least one processer, cause the at least one processor to transmit, via the communication interface, a video presentation featuring a subject person to the plurality of users via a first communication format. The instructions also cause the processor to receive from at least one user of the plurality of users during the video presentation, a request to initiate an interactive session with an avatar of the subject person. In response to the request, the instructions cause the processor to generate a first avatar of the subject person and initiate a first interactive session between the first avatar and the at least one user. The instructions also cause the processor to engage in the first interactive session between the first avatar of the subject person and the at least one user via a second communication format that is different than the first communication format.

In another aspect, a method of providing an interactive digital avatar of a subject person is provided. The method includes transmitting a video featuring a subject person to a plurality of users via a first communication format. The method also includes receiving, from at least one user of the plurality of users, a request to initiate an interactive session with an avatar of the subject person. The method further includes engaging in the interactive session between the avatar of the subject person and the at least one user via a second communication format that is different than the first communication format.

In another aspect, a system for providing an interactive digital avatar of a subject person is provided. The system includes a communication interface allowing communication with one or more users of a plurality of users. The system also includes an artificial intelligence engine in communication with the communication interface, the artificial intelligence engine including at least one processor, a memory, and storage for computer-readable instructions that, when executed by the at least one processer, cause the at least one processor to: transmit, via the communication interface, a video featuring a subject person to the plurality of users via a first communication format; receive, from at least one user of the plurality of users, a request to initiate an interactive session with an avatar of the subject person; and engage in the interactive session between the avatar of the subject person and the at least one user via a second communication format that is different than the first communication format.

In still another aspect, a method of providing an interactive digital avatar of a subject person is provided. The method includes transmitting a video featuring at least one subject person to a plurality of users. The method also includes receiving, from a first user of the plurality of users, a request to initiate a first interactive session with a first avatar of a first subject person featured in the video. The method further includes engaging in the first interactive session between the first avatar of the first subject person and the first user. The method also includes receiving, from a second user of the plurality of users, a request to initiate a second interactive session with a second avatar of a second subject person featured in the video. The method includes engaging in the second interactive session between the second avatar of the second subject person and the second user. At least a portion of the first interactive session and the second interactive session occur concurrently.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

According to the techniques described herein, a system and method for an interactive digitally rendered avatar of a subject person is provided. The example embodiments allow one or more users to virtually interact with the digitally rendered avatar of the subject person in a way that mimics or emulates the speech, mannerisms, and inflections of the subject person.

The example embodiments described herein make use of methods and systems employing artificial intelligence (AI). As used herein, "artificial intelligence" may include any known methods or techniques in machine learning and related fields. As examples, artificial intelligence may include systems and methods used in natural language processing (NLP) and similar fields.

Figure 1:
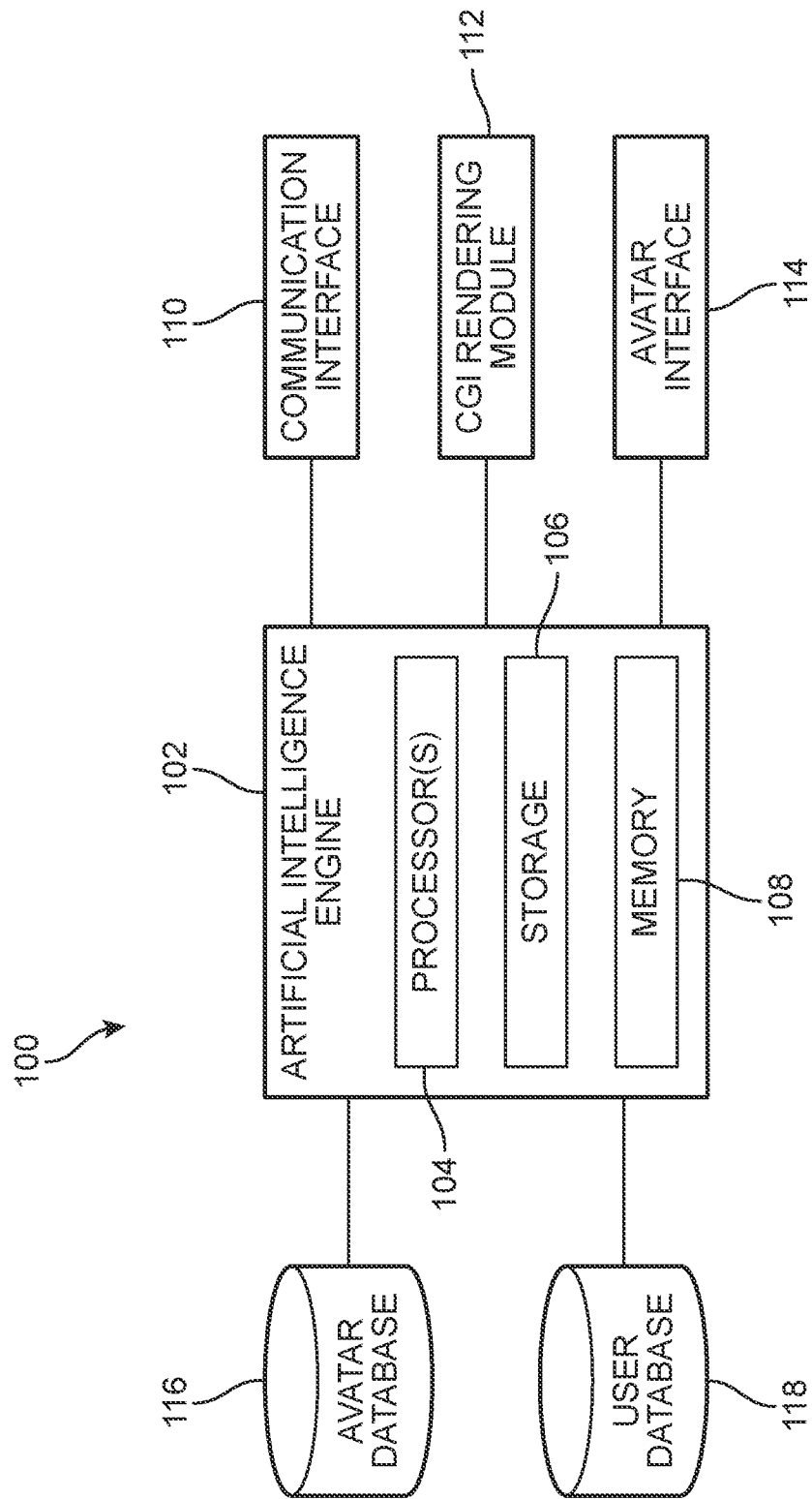
FIG. 1 is a block diagram of an example embodiment of a system for an interactive digitally rendered avatar of a subject person.

FIG. 1 is a block diagram of an example embodiment of a system 100 for providing an interactive digitally rendered avatar of a subject person. In some embodiments, components of system 100 may be implemented in hardware, software, and/or a combination of hardware and software to execute the functions and operations described herein to provide an interactive digitally rendered avatar. As will be described in more detail below, system 100 uses an artificial intelligence (AI) engine 102 to process and analyze a plurality of data associated with one or more subject persons and uses the data to render and generate an interactive avatar of the subject person that is configured to mimic or emulate the speech, mannerisms, and inflections of the subject person.

In an example embodiment, AI engine 102 may include at least one computer system having a processor configured to execute programs to implement the techniques described herein. The term "computer system" refers to the computing resources of a single computer, the partial computing resources of a single computer, a plurality of computers communicating with one another, a network of remote servers, or other computing devices having at least one processor. In one embodiment, the computer system implementing AI engine 102 includes at least one processor, for example, a processor 104, configured to implement the functions of the interactive digitally rendered avatar system (e.g., system 100) described herein.

AI engine 102 may also include persistent storage 106 and a memory 108. In an example embodiment, storage 106 and memory 108 are computer readable storage media. For example, persistent storage 106 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. In some embodiments, the media used by storage 106 may also be removable. For example, a removable hard drive may be used for storage 106. Other examples include optical and magnetic disks, thumb drives, and smart cards that are inserted into a drive for transfer onto another computer readable storage medium that is also part of storage 106.

Memory 108 may include random access memory (RAM) and/or cache memory. In general, memory 108 can include any suitable volatile or non-volatile computer readable storage media. Instructions for executing operations of AI engine 102 may be stored in storage 106 and/or memory 108 for execution by processor(s) 104.

One or more programs may be stored in storage 106 for execution by one or more of the respective computer processors 104 via one or more memories of memory 108. For example, the one or more programs may include software instructions that, when executed by the one or more processors 104, cause AI engine 102 to perform the operations of the interactive digitally rendered avatar system (e.g., system 100) described herein and shown in connection with the accompanying Figures.

Aspects of the example embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

In addition, AI engine 102 may include additional computing system components, such as a bus to provide communication between processor(s) 104, storage 106, and memory 108, as well as other components of system 100, such as a communication interface 110, a computer graphics interface (CGI) rendering module 112, an avatar interface 114, one or more databases (including an avatar database 116 and a user database 118), as well as various input/output (I/O) interface(s) that facilitate communication between the various components of system 100.

Communication interface 110 provides for communications with other data processing systems or devices over a communication network. In an example embodiment, communication interface 110 may include one or more network interface cards. Communication interface 110 may provide communications through the use of either or both physical and wireless communications links. In an example embodiment, communication interface 110 may be configured to communicate using multiple types or formats of communication, including, but not limited to broadcast, multicast or other one-to-many communication sessions with a plurality of users, as well as one or more one-on-one communication sessions with individual users, such as two-way communication sessions that include transmitting and/or receiving video, audio, and/or text.

The communication network may be implemented by any number of any type of communications network (e.g., LAN, WAN, Internet, Intranet, VPN, etc.). The computer or other processing systems of the example embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

In an example embodiment, system 100 includes computer graphics interface (CGI) rendering module 112. CGI rendering module 112 is configured to generate a digital representation of a subject person, including at least a face/head or a partial or full body of the subject person. In an example embodiment, the interactive digital avatar of the subject person rendered and generated by CGI rendering module 112 may be output for display through avatar interface 114 to interact with one or more users, as will be described in more detail below.

In the embodiment of FIG. 1, AI engine 102 may be in communication with one or more databases, avatar database 116 and/or user database 118. Databases 116, 118 could be co-located with AI engine 102 or could be remote databases that are accessible by AI engine 102 over a communication network. Databases 116, 118 can include any kind of storage devices, including but not limited magnetic, optical, magneto-optical, and/or memory, including volatile memory and non-volatile memory.

In one embodiment, avatar database 116 may include one or more data collections containing information associated with each subject person and their associated avatar that may be digitally rendered using system 100, as will be described in detail below in reference to FIG. 2. User database 118 may include data or information associated with one or more users of system 100, as will be described in detail below in reference to FIG. 3.

In some embodiments, CGI rendering module 112 may receive information or data about the subject person from AI engine 102, including information or data about the subject person stored in avatar database 116, that allows CGI rendering module 112 to digitally render and generate an interactive avatar of the subject person that physically resembles the subject person and that is configured to mimic or emulate the speech, mannerisms, and inflections of the subject person.

Figure 2:
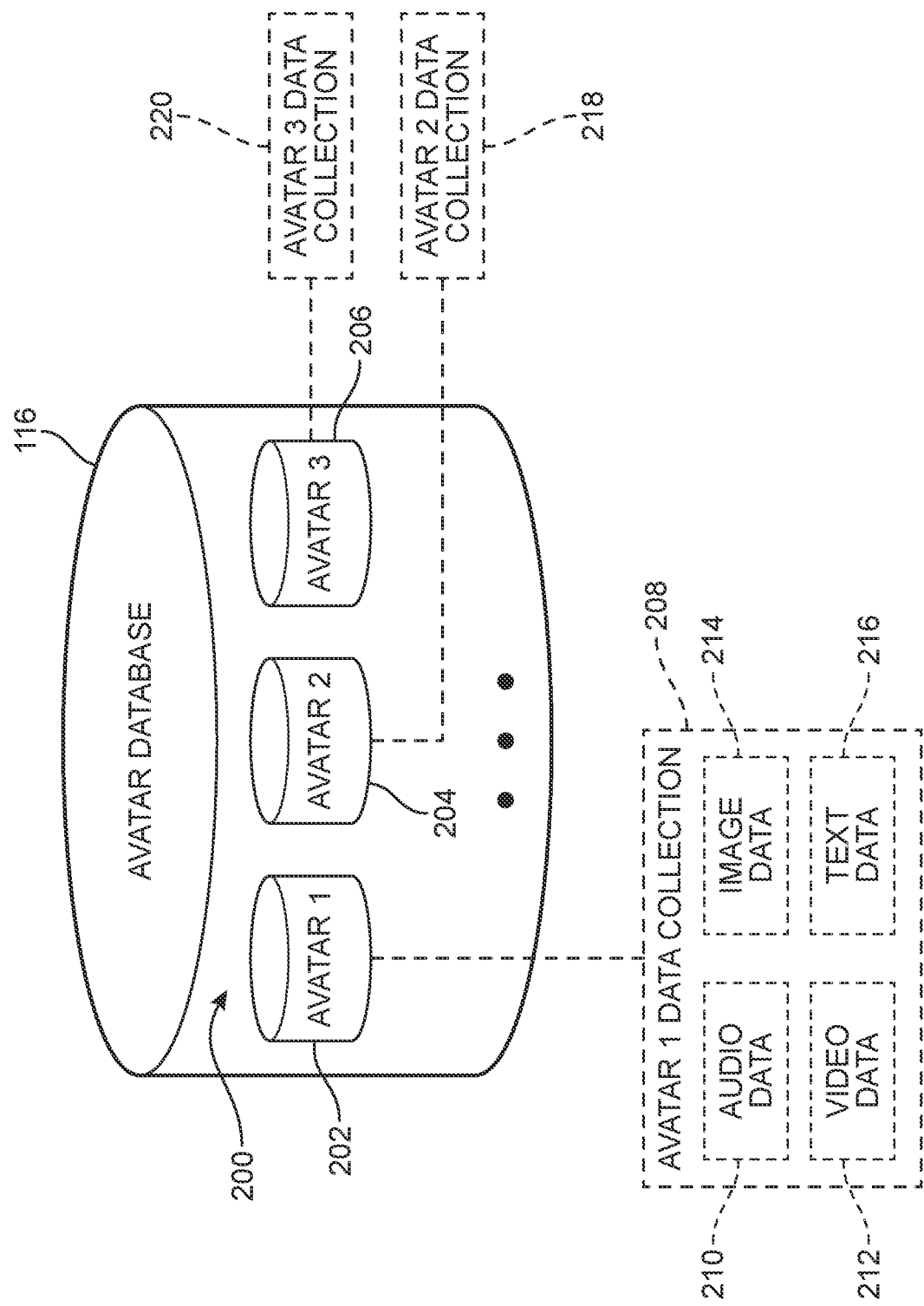
FIG. 2 is a detailed view of an example embodiment of an avatar database.

Referring now to FIG. 2, a detailed view of an example embodiment of avatar database 116 is shown. In some embodiments, avatar database 116 may include one or more data collections comprising data or information associated with a subject person that allows AI engine 102 to generate an interactive digital avatar of the subject person. In an example embodiment, avatar database 116 may include a plurality of data collections 200 for one or more avatars of a subject person or subject persons. As shown in FIG. 2, plurality of data collections 200 includes data collections associated with each of a first avatar 202, a second avatar 204, and a third avatar 206. It should be understood that data collections for three avatars (202, 204, 206) are shown in FIG. 2 for purposes of illustration and avatar database 116 may include data collections for any number of avatars.

In some embodiments, a data collection and/or training process may be executed by AI engine 102 of system 100 to obtain, sort, analyze, and process the various data forming plurality of data collections 200 that is stored in avatar database 116 associated with each avatar. Additionally, AI engine 102 may also execute one or more training sessions using CGI rendering module 112 to generate a digital representation of the subject person for each subject person's avatar. These training sessions may be used to refine the interactive avatar of the subject person to accurately mimic or emulate the speech, mannerisms, and inflections of the subject person. In some embodiments, these training processes or sessions may be implemented using machine-learning techniques.

In some cases, plurality of data collections 200 may be associated with avatars of different subject persons. For example, a first data collection 208 for first avatar 202 may be associated with a first subject person, a second data collection 218 for second avatar 204 may be associated with a second subject person that is different from the first subject person, and a third data collection 220 for third avatar 206 may be associated with a third subject person that is different from both the second subject person and the first subject person.

Additionally or alternatively, plurality of data collections 200 may also be associated with avatars of the same subject person at different ages or age ranges. For example, first data collection 208 for first avatar 202 may be associated with a first subject person at a first age (or first age range) and second data collection 218 for second avatar 204 may be associated with the same first subject person at a second age (or second age range) that is different than the first age (e.g., at an older or younger age or age range).

By storing different data collections for avatars of the same subject person at different ages or ages ranges, the subject person may have an interactive digital avatar that mimics or emulates the speech, mannerisms, and inflections of the subject person at a first age and another interactive digital avatar that mimics or emulates the speech, mannerisms, and inflections of the subject person at a second age that is older or younger than the first age. With this arrangement, interactive digital avatars of the same subject person at different ages can accurately represent the physical appearance and speech, mannerisms, and inflections of the subject person at different time periods in the subject person's life.

In this embodiment, a representative data collection, for example, first data collection 208 for first avatar 202 is shown in detail. In an example embodiment, each data collection of plurality of data collections 200 may include various types and formats of data or information associated with a subject person. For example, as shown in FIG. 2, first data collection 208 may include audio data 210, video data 212, image data 214, and/or text data 216 associated with a subject person.

Audio data 210 can include one or more voice files or recordings of the subject person speaking or reading so that AI engine 102 may use audio data 210 to accurately mimic the speech, voice inflections, and manner of speaking of the subject person. For example, audio data 210 may include archived speeches by the subject person, recorded audio messages, songs, or readings by the subject person. Additionally, audio data 210 may also include audio files of the subject person obtained from video data 212.

Video data 212 can include one or more video files or recordings of the subject person so that AI engine 102 may use video data 212 to accurately mimic facial expressions, hand movements, body posture, and other physical mannerisms of the subject person. For example, video data 212 may include short or long clips or movies of the subject person, including professional or home movies, as well as other video recordings from security cameras or motion capture devices.

Image data 214 can include one or more image files or photographs of the subject person so that AI engine 102 may use image data 214 to accurately render and generate the physical characteristics of at least the face/head or the partial or full body of the subject person from a variety of different angles and perspectives. AI engine 102 may use CGI rendering module 112 to generate a three-dimensional representation of the subject person from the plurality of two-dimensional representations of the subject person from image data 214. Additionally, image data 214 may also include one or more frames of the subject person obtained from video data 212.

Text data 216 can include one or more text files or data written, typed, or otherwise generated by the subject person. For example, text data 216 may include letters, emails, text messages, books, presentations, social media posts or comments, or any other format of text written or generated by the subject person.

In addition, audio data 210, video data 212, image data 214, and/or text data 216 associated with the subject person stored in first data collection 208 may include dates, time stamps, or other identifiers of time that allow AI engine 102 to identify a time period or age range of the subject person when the associated data was generated. With this arrangement, first data collection 208 can represent the collected information or data associated with the subject person at a particular age or age range of their life so that the interactive digital avatar generated by AI engine 102 can accurately reflect the subject person at that particular age or age range.

As described herein, a subject person may include any person living or deceased. Examples of a subject person include, but are not limited to: celebrities, politicians or elected officials, athletes, scholars, teachers or professors, authors, trainers, experts in various fields, family members, historical figures, private individuals, or any other person. With this arrangement, any subject person may have a collection of data that allows AI engine 102 to generate an interactive digital avatar for that person.

In some embodiments, system 100 may certify or authenticate an avatar of a subject person to verify or confirm that the interactive digital avatar of the subject person is approved or authorized by the subject person. For example, an interactive digital avatar according to the example embodiment may include an indicia or certificate that asserts to users of system 100 that the avatar is verified as an official avatar approved by the subject person. With this arrangement, users can be assured of interacting with approved avatars of the subject person and imposter or fake avatars of the subject person may be avoided by users.

Figure 3:
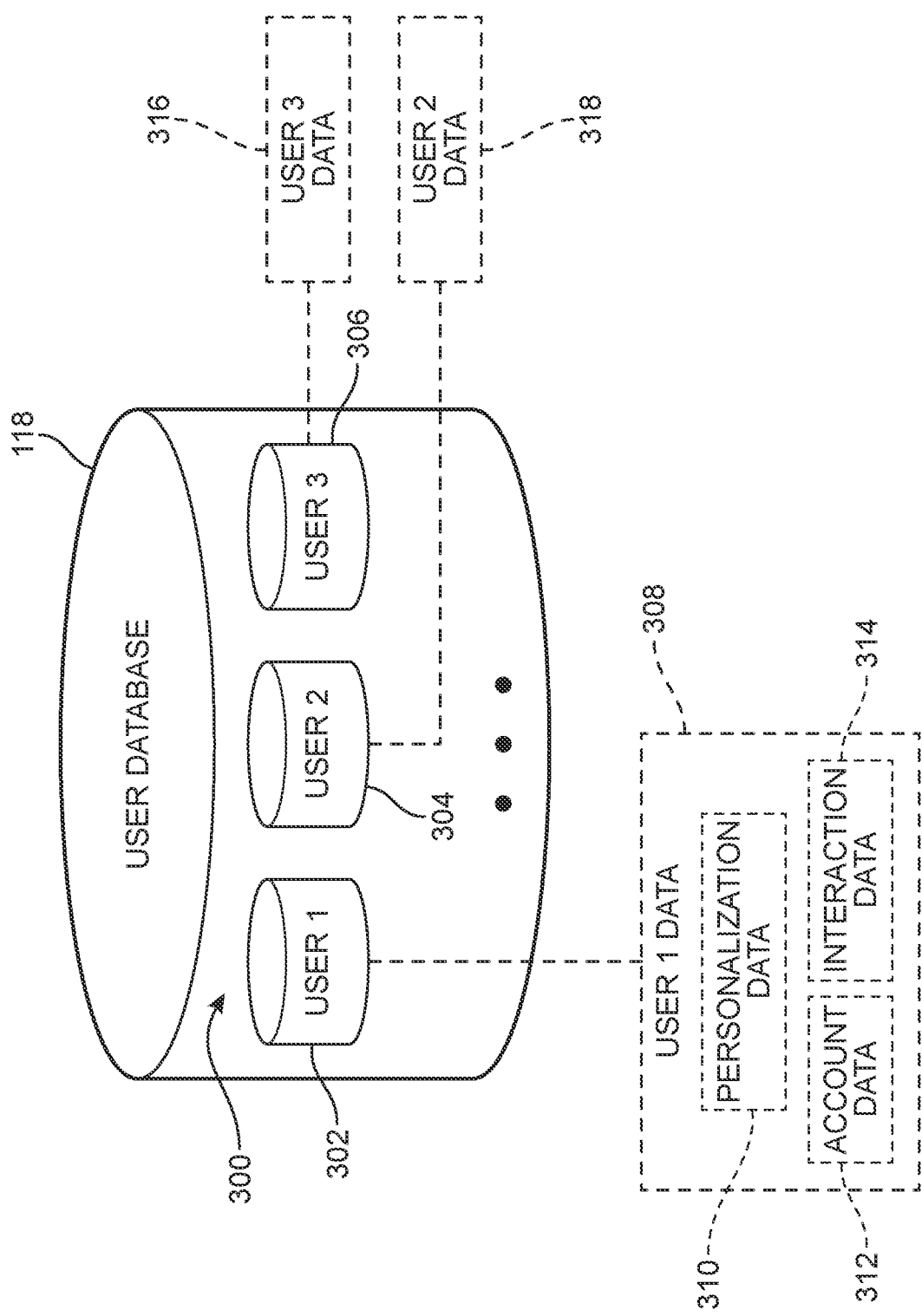
FIG. 3 is a detailed view of an example embodiment of a user database.

Referring now to FIG. 3, a detailed view of an example embodiment of user database 118 is shown. In some embodiments, system 100 may store information or data associated with one or more users of system 100. That is, users may be any person that interacts with one or more of the interactive digital avatars of a subject person generated by system 100. In an example embodiment, user database 118 may include a plurality of user files 300 that contain data sets associated with each user of system 100. In this embodiment, plurality of user files 300 includes a user file for a first 302, a user file for a second user 304, and a user file for a third user 306. It should be understood that user files for three users (302, 304, 306) are shown in FIG. 3 for purposes of illustration and user database 118 may include user files for any number of users of system 100.

In this embodiment, a representative user file, for example, a first data set 308 for first user 302 is shown in detail. In an example embodiment, each data set included in the user files of plurality of user files 300 may include various types of data or information associated with a user of system 100. For example, as shown in FIG. 3, first data set 308 may include personalization data 310, account data 312, and/or interaction data 314 associated with a user (e.g., first user 302).

Personalization data 310 can include various personal data or information associated with first user 302 so that AI engine 102 may use personalization data 310 to customize or personalize the interaction between a digital avatar and first user 302. For example, personalization data 310 may include the user's name, birthday, hair or eye color, names of family members, the user's preferences (e.g., nicknames, topics of conversation, greeting types, favorite subjects, etc.), and other information that can be used by AI engine 102 to personalize or customize interactions between the user and the digital avatar of the subject person.

Account data 312 can include account identifiers, such as user names and passwords or account numbers, billing and payment information for the user, including payment types (e.g., credit cards or cryptocurrency), billing addresses, subscription or account plan information, etc. For example, system 100 may bill or charge users on a per transaction basis (i.e., for each interactive avatar session), on a time basis (e.g., on a per minute or other time increment basis), and/or may include various tiers or membership plans that offer varying degrees or amounts of access to digital avatars. In some cases, different avatars may have different fees or rates. In other cases, system 100 may be free to users and may generate revenue through advertising or other types of sponsorships, including virtual endorsements by one or more of the digital avatars of system 100.

Interaction data 314 can include various information and data associated with one or more interactive avatar sessions between the user and one or more avatars of a subject person or subject persons. For example, interaction data 314 may include log files or other captured transcripts of conversations between the user and the avatar, including dates, times, duration of the interaction, topics discussed, etc. The information or data included in interaction data 314 may be used by system 100 for billing purposes as well as to improve the personalization or customization of the interaction between the user and the digital avatar of the subject person. For example, information or data included in interaction data 314 obtained from an interactive session with a digital avatar (such as a user describing favorite colors or foods, or referring to family members by name or relationship) may be added to personalization data 310 in first data set 308 for first user 302 to be used by AI engine 102 in subsequent interactive sessions with a digital avatar to provide personalized or customized interactions with the user.

Plurality of user files 300 may include a similar user file for each user of the plurality of users of system 100 that is stored in user database 118. For example, second user 304 may have a second data set 316 and third user 306 may have a third data set 318 that include data and information of a similar type and category as the data and information associated with first data set 308, but that is specific to the individual user. That is, each user (first user 302, second user 304, and third user 306) will have a unique data set in their user file stored in user database 118 that includes their own personalization data, account data, and interaction data. In this manner, user database 118 may be used by AI engine 102 of system 100 to ensure that each interactive session between a user and a digital avatar of a subject person is a uniquely personalized and/or customized experience, even when users are interacting with digital avatars of the same subject person. With this arrangement, because the interactive session uses the user's own data set from their user file, no two interactive sessions will be the same.

Figure 4:
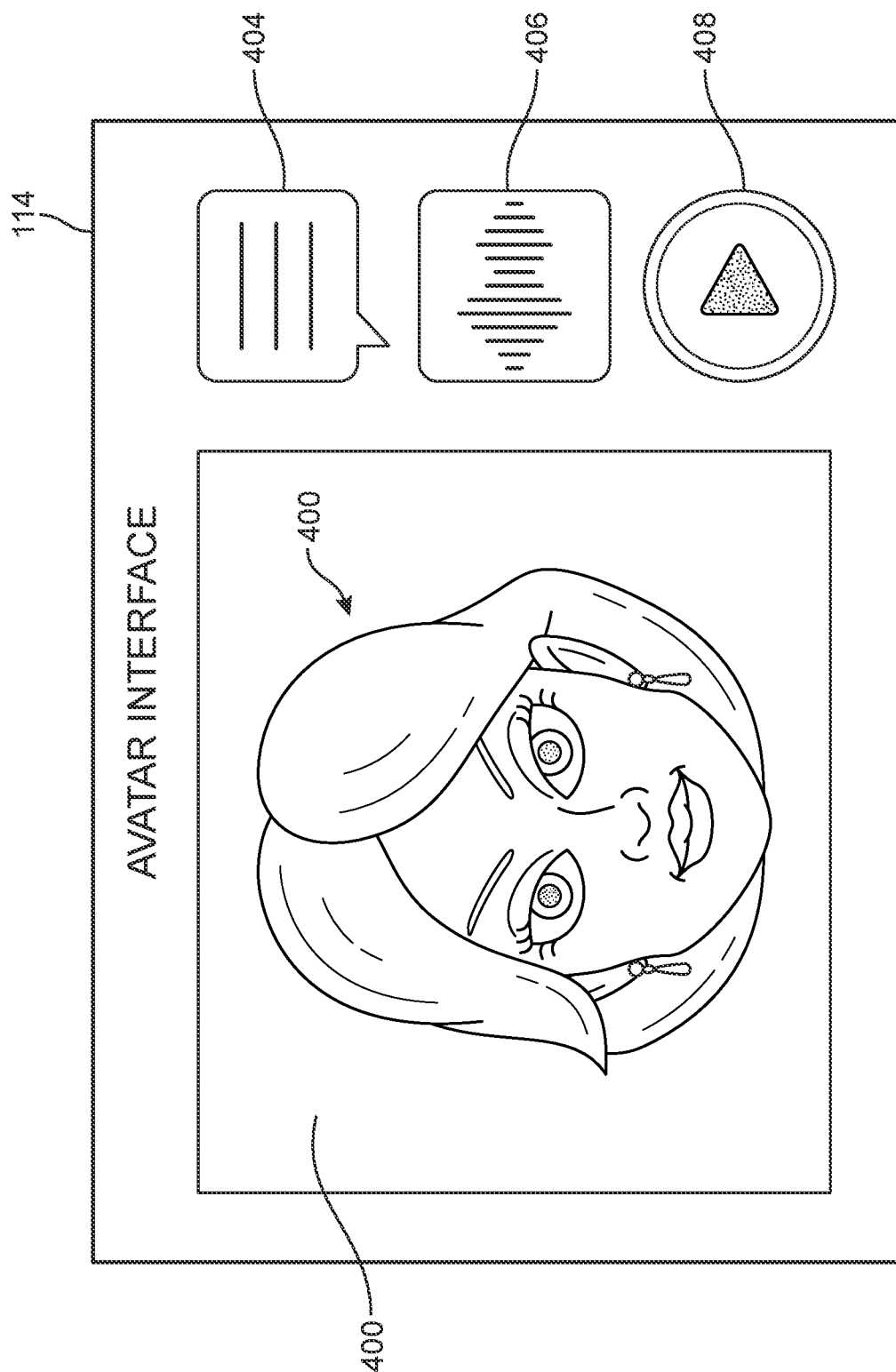
FIG. 4 is a representative view of an example embodiment of an avatar interface.

Referring now to FIG. 4, a representative view of an example embodiment of avatar interface 114 is shown. As described above, an interactive digital avatar of a subject person may be rendered and generated by CGI rendering module 112 and is output for display through avatar interface 114 to interact with one or more users. In this embodiment, avatar interface 114 includes a display area 400 in which an interactive digital avatar 402 is displayed. In an example embodiment, avatar interface 114 may be configured as an application or software program that executes instructions from AI engine 102 and CGI rendering module 112 to output interactive digital avatar 402 in display area 400 of avatar interface 114. In some embodiments, avatar interface 114 may be displayed on a display of a user interface of a user interacting with system 100, such as one or more of the user interfaces described below in reference to FIG. 5.

In some embodiments, avatar interface 114 may embedded or integrated into an existing application or software program to allow the existing application or software program to provide the functionality of an interactive digital avatar in accordance with the techniques described herein. In these embodiments, components of system 100 may be provided as a module that interacts with and is included in the existing application or software program to provide interactive digital avatar capabilities to that existing application or software program. For example, an existing video calling, meeting, or presentation application or software program may incorporate the functionality of an interactive digital avatar using system 100.

In some embodiments, avatar interface 114 may provide one or more different types or forms of communication between interactive digital avatar 402 and the user interacting with interactive digital avatar 402 through avatar interface 114. In this embodiment, avatar interface 114 includes one or more of text 404, audio 406, and video 408 options for a user to interact with interactive digital avatar 402. For example, a user may choose to engage with interactive digital avatar 402 via text 404 by typing on a keyboard or touchscreen input, via audio 406 by speaking into a microphone or other audio sensor to capture user's spoken words or input, and/or via video 408 by using a video camera or other recording device to speak and interact with interactive digital avatar 402.

In this embodiment, interactive digital avatar 402 shown in display area 400 of avatar interface 114 is in the form of a head and/or face of a subject person. In other embodiments, interactive digital avatar 402 may take other forms, including at least a partial or full body avatar of the subject person. For example, in some embodiments, interactive digital avatar 402 may include a representation of a subject person from the waist up and include hands and arms so that interactive digital avatar 402 may mimic or emulate hand movements or other body language of the subject person. In still other embodiments, interactive digital avatar 402 may include a full body representation of a subject person that mimics or emulates entire body movements or motions of the subject person, including, for example, walking gaits, dance moves, exercise routines, etc.

Figure 5:
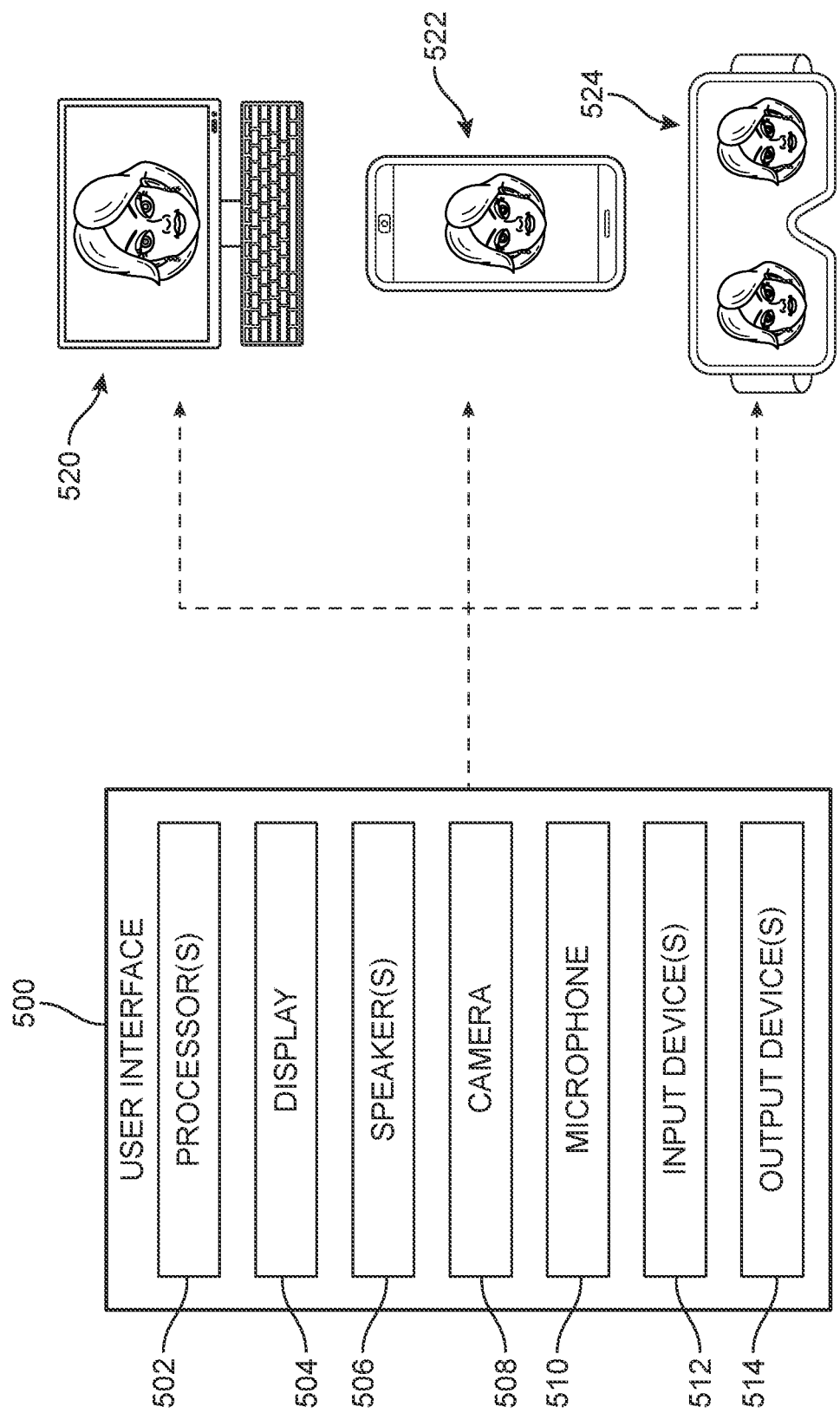
FIG. 5 is a representative view of an example embodiment of a user interface.

Referring now to FIG. 5, an example embodiment of a user interface 500 that allows a user to interact with system 100 is shown. In some embodiments, user interface 500 provides a mechanism that allows a user of system 100 to interact with or engage with an interactive digital avatar of a subject person through avatar interface 114. For example, avatar interface 114 may be an application or software program that runs or executes on user interface 500 and receives data or commands from AI engine 102 of system 100 to control the actions of the interactive digital avatar of the subject person through avatar interface 114.

In an example embodiment, user interface 500 may include at least one processor 502 and a display 504. Display 504 may be used to display the interactive digital avatar of the subject person through avatar interface 114. User interface 500 may also include one or more speakers 506 that are configured to output audio, including audio from the interactive digital avatar of the subject person through avatar interface 114. In some embodiments, user interface 500 may also include components that allows a user to send or transmit audio and/or video to system 100, such as, for example, a camera 508 configured to capture or record video and/or image information from the user and a microphone 510 configured to capture or record audio information from the user. In an example embodiment, system 100 may use inputs from a user captured by one or more of camera 508 and/or microphone 510 of user interface 500 to initiate an interactive session and/or during an interactive session with an avatar. For example, camera 508 and/or microphone 510 of user interface 500 may capture one or more of gestures, facial expressions, or body language of a user that may then be used by AI engine 102 of system 100 to start an interactive session or as an input used to determine potential responses by an interactive avatar to the user.

In some embodiments, user interface 500 may also include one or more other input devices 512 and/or one or more other output devices 514. In some embodiments, user interface 500 may also include an input and/or output to a voice assistant to allow a user to speak commands and instructions via user interface 500 to interact with system 100 and/or one or more interactive avatars generated by system 100. For example, a user may speak "initiate interactive session" to the voice assistant to request an interactive session with an interactive avatar of a subject person. With this arrangement, user interface 500 allows a user to engage in an interactive session with the interactive digital avatar of the subject person through avatar interface 114 in a manner that simulates a video and/or audio call with an actual person.

In different embodiments, user interface 500 may take any one or more of a variety of different forms or devices. For example, as shown in FIG. 5, user interface 500 may be embodied in a computer 520 on which the user may engage with interactive digital avatar of the subject person through avatar interface 114. User interface 500 may also be embodied in a mobile device 522, such as a smartphone or tablet computer, on which the user may engage with interactive digital avatar of the subject person through avatar interface 114. In still another embodiment, user interface 500 may be embodied in a virtual reality (VR) or augmented reality (AR) headset 524 on which the user may engage with interactive digital avatar of the subject person through avatar interface 114. It should be understood that the examples of user interface 500 shown in FIG. 5, including computer 520, mobile device 522, and/or VR/AR headset 524 are not limiting and other devices or forms of user interface 500 may be provided to interact with the interactive digital avatars of system 100.

Figure 6:
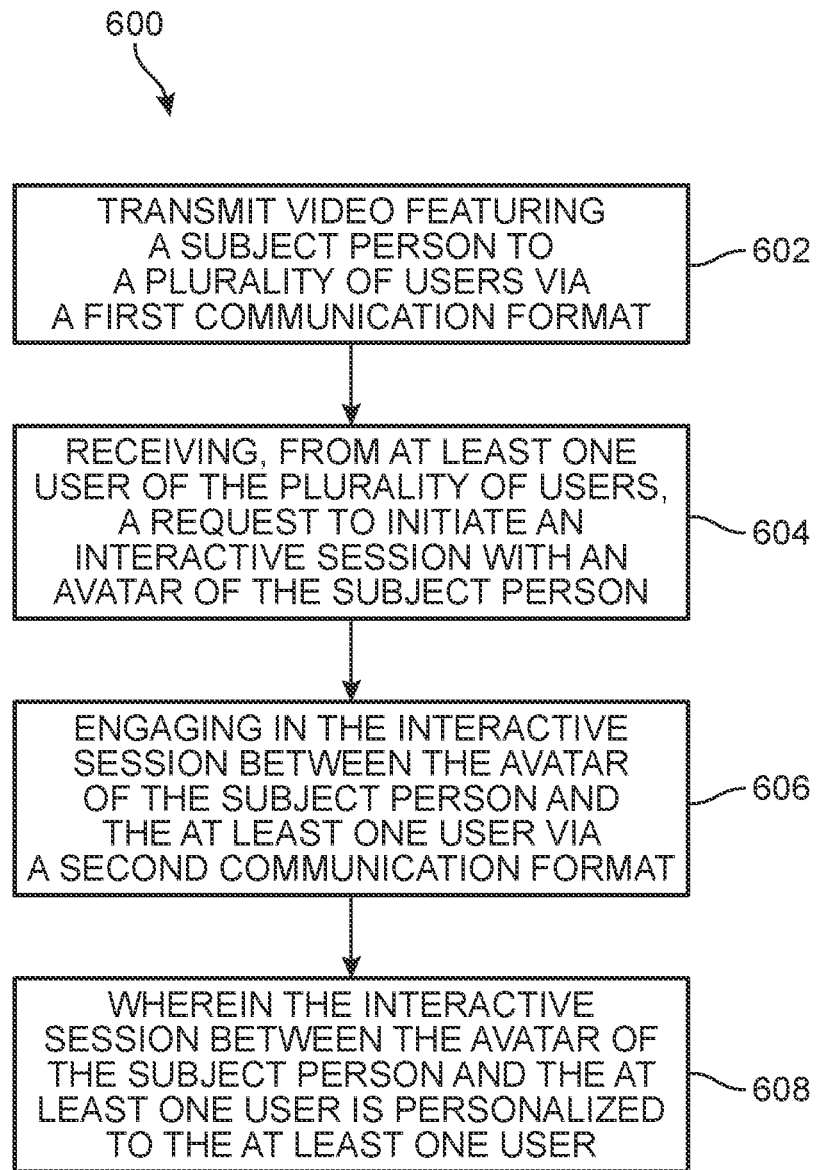
FIG. 6 is a flowchart of an example embodiment of a method for providing an interactive digitally rendered avatar of a subject person.

Referring now to FIG. 6, a flowchart of an example embodiment of a method 600 for providing an interactive digitally rendered avatar of a subject person is illustrated. In some embodiments, method 600 may be implemented by at least one processor of system 100, for example, one or more of processors 104 of AI engine 102, described above, to provide the operations of interactive digitally rendered avatar described herein. Method 600 describes one example implementation of providing an interactive digitally rendered avatar of a subject person. It should be understood that other implementations may be provided, such as upon initiation or request by a user of system 100, as well as other methods.

In this embodiment, method 600 may begin at an operation 602. At operation 602, video featuring a subject person may be transmitted to a plurality of users via a first communication format. For example, at operation 602, a live or pre-recorded video of a subject person may be broadcast or streamed to a plurality of users of system 100. Next, method 600 includes an operation 604. At operation 604, a request to initiate an interactive session with an avatar of the subject person is received from at least one user of the plurality of users. For example, at operation 604, one of the users of the plurality of users receiving the video featuring the subject person at operation 602 may choose to engage in an interactive session with an interactive digital avatar of the subject person by sending a request to system 100.

Upon receiving the request from at least one user at operation 604, method 600 may proceed to an operation 606. At operation 606, method 600 includes engaging in the interactive session between the avatar of the subject person and the at least one user via a second communication format. For example, at operation 606, system 100 may initiate an interactive session between the user and the interactive digital avatar (e.g., interactive digital avatar 402) via a two-way communication format that allows the user and the interactive digital avatar to engage in a one-on-one conversation or interaction through avatar interface 114 on user interface 500, described above.

Additionally, method 600 includes an operation 608. At operation 608, the interactive session between the avatar of the subject person and the at least one user is personalized to the at least one user. For example, as described above in reference to FIG. 3, the interaction between the user and the interactive digital avatar (e.g., interactive digital avatar 402) may be personalized or customized using information (e.g., personalization data 310) from the data set in the user's user file stored in user database 118. With this arrangement, method 600 may provide a personalized and customized interactive session with a digital avatar of a subject person that is unique to the user. Method 600 may implemented any number of times for any number of users to generate separate interactive sessions for each user. Additionally, in some cases, method 600 may be implemented simultaneously or concurrently for multiple users of the plurality of users of system 100 so that each user may experience an individual, one-on-one interactive session with the digital avatar of the subject person. Method 600 may also be implemented in a manner so that two or more interactive sessions between different users are overlapping or at least partially occurring at the same time.

Figure 7:
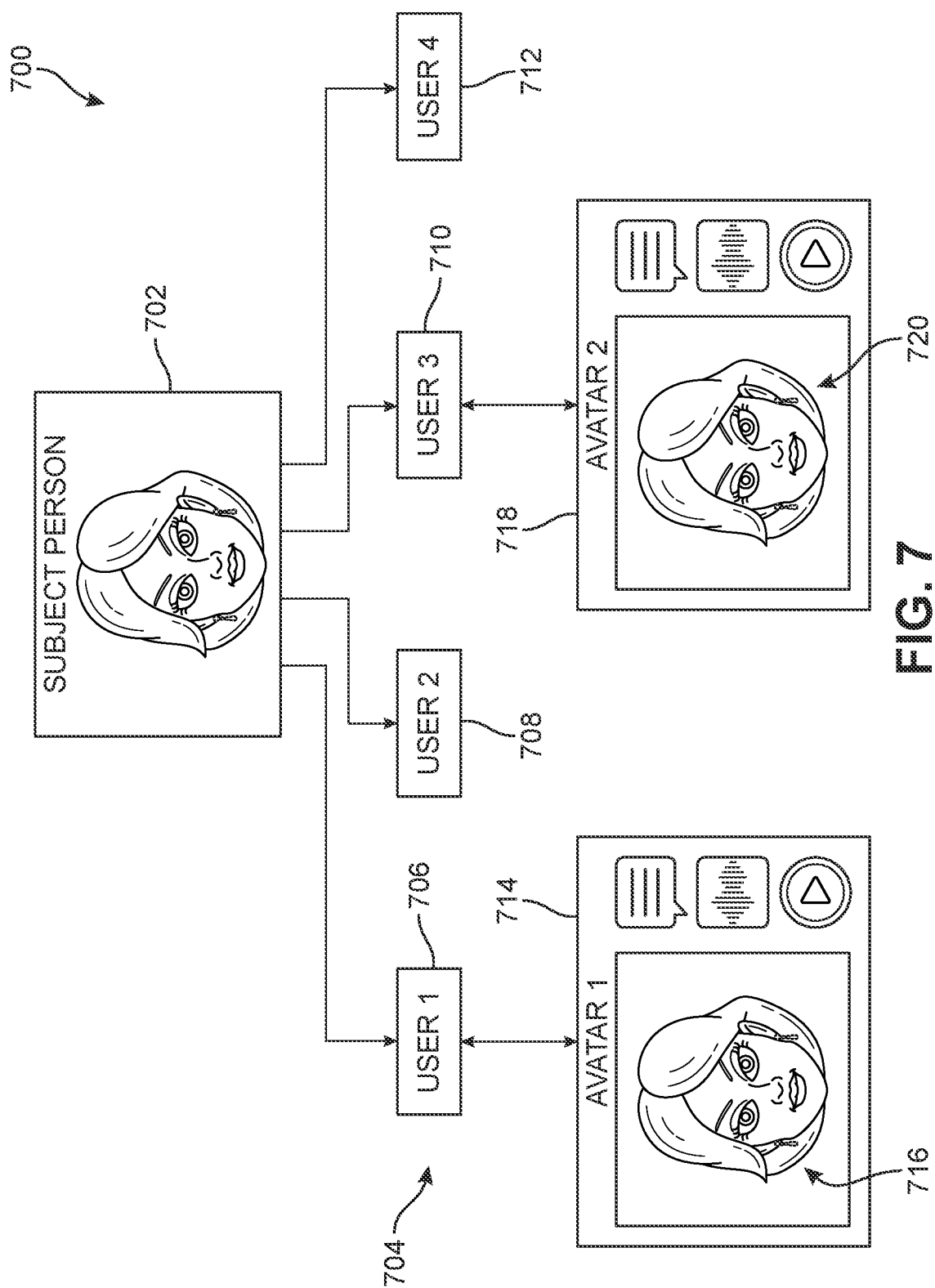
FIG. 7 is a representative view of an example embodiment of users engaging with an interactive digitally rendered avatar of a subject person.

Referring now to FIG. 7, an example embodiment of a scenario 700 in which a plurality of users are engaging with an interactive digitally rendered avatar of a subject person is shown. In this embodiment, a subject person 702, such as a celebrity or politician, is broadcasting or streaming a video to a plurality of users 704. In scenario 700, subject person 702 may be transmitting a pre-recorded video or may be live. For example, the video may be a panel discussion or talk, a movie or television program, a political rally, a sporting event, a concert, or any other live or recorded activity or event that is intended for an audience.

In an example embodiment, subject person 702 has an associated data collection stored in avatar database 116 of system 100 for an interactive digital avatar of subject person 702. For example, the data collection stored in avatar database 116 may include one or more of audio data, video data, image data, or text data associated with subject person 702 that allows AI engine 102 to generate an interactive digital avatar of subject person 702, as described above.

In an example embodiment, each subject person (e.g., subject person 702 in scenario 700) may have information or data gathered or collected for the data collection stored in avatar database 116 associated with the subject person's avatar in advance (i.e., before initiating an interactive session with the subject person's avatar). For example, as described above, a data collection and/or training process may be executed by AI engine 102 of system 100 to obtain, sort, analyze, and process the various data forming the data collection that is stored in avatar database 116 associated with the subject person's avatar. Additionally, AI engine 102 may also execute one or more training sessions using CGI rendering module 112 to generate a digital representation of the subject person for the subject person's avatar. These training sessions may be used to refine the interactive avatar of the subject person to accurately mimic or emulate the speech, mannerisms, and inflections of the subject person. In some embodiments, these training processes or sessions may be implemented using machine-learning techniques.

In this embodiment, subject person 702 in scenario 700 is shown broadcasting or streaming a video to plurality of users 704, including at least a first user 706, a second user 708, a third user 710, and a fourth user 712 (e.g., as part of operation 602 of method 600, described above). According to the example embodiments, plurality of users 704 may be located at different locations and may be using different devices (e.g., one or more types of user interfaces 500) to watch the video featuring subject person 702. In an example embodiment, when at least one user of plurality of users 704 would like to interact with a digital avatar of subject person 702 during the video, that user may send or transmit a request to system 100 to initiate an interactive session with an avatar of subject person 702 (e.g., as part of operation 604 of method 600, described above).

In this embodiment, first user 706 has made a request to start an interactive session with a digital avatar of subject person 702. In response, system 100 generates and renders a first interactive avatar 716 through a first avatar interface 714 to allow first user 706 to interact with first interactive avatar 716 of subject person 702. In contrast to the video from subject person 702 to plurality of users 704 (which may be a one-way communication, such as a broadcast or stream), the interactive session between first user 706 and first interactive avatar 716 is a two-way communication that allows text, audio, and/or video to be transmitted and received in a bi-directional manner between first user 706 and first interactive avatar 716. For example, in one embodiment, the two-way communication between first user 706 and first interactive avatar 716 may be provided through first avatar interface 714 and at least one user interface 500 associated with first user 706.

Additionally, any of the other users of plurality of users 704 may also separately, simultaneously, or concurrently request to start their own interactive session with a digital avatar of subject person 702. In response to each such request, system 100 may generate and render additional instances of interactive digital avatars of subject person 702 to interact with each additional user making a request. For example, as shown in FIG. 7, third user 710 has also made a request to start an interactive session with a digital avatar of subject person 702. This request may be made at the same time as the request by first user 706 or may be made at a different time that is earlier or later than the request by first user 706. In response, system 100 generates and renders a second interactive avatar 720 through a second avatar interface 718 to allow third user 710 to interact with second interactive avatar 720 of subject person 702.

According to the example embodiments, each of first user 706 and third user 710 are engaging in an interactive session with a digital avatar of the same subject person (e.g., subject person 702), however, system 100 provides each user with their own instance of an interactive digital avatar (e.g., first interactive avatar 716 for first user 706 and second interactive avatar 720 for third user 710). With this arrangement, each user may have a personalized and customized interactive session with their specific instances of the digital avatar of subject person 702.

Figure 8:
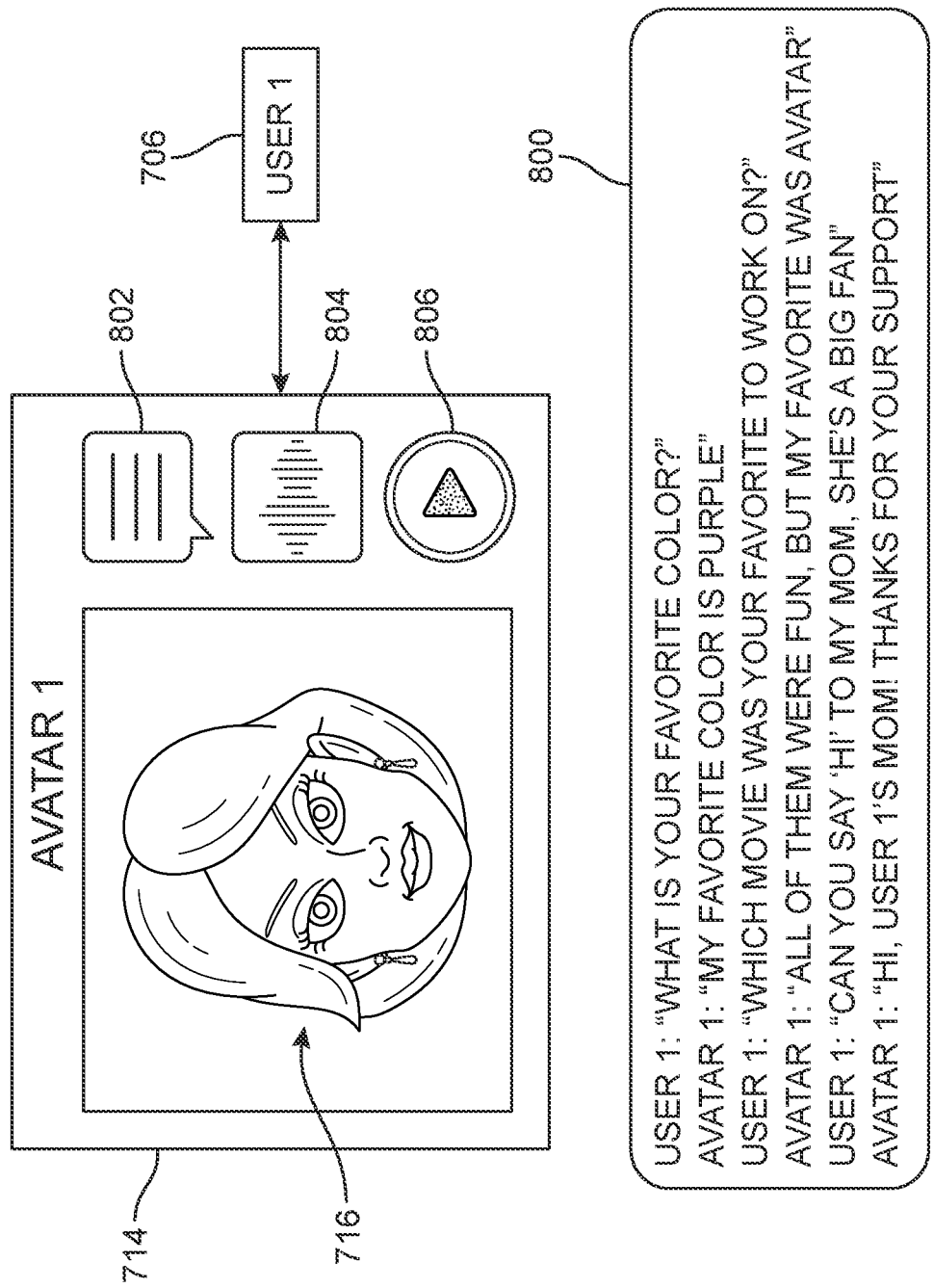
FIG. 8 is a detailed view of an example embodiment of an interaction between a user and an interactive digitally rendered avatar of a subject person.

Referring now to FIG. 8, a detailed view of an example embodiment of an interaction between a user and an interactive digitally rendered avatar of a subject person is shown. In this embodiment, a representative interactive session 800 between first user 706 and first interactive avatar 716 of subject person 702 is shown. In an example embodiment, communication during interactive session 800 between first interactive avatar 716 and first user 706 may be made through first avatar interface 714 which may be provided on at least one type of user interface 500 associated with first user 706. In this embodiment, first avatar interface 714 includes one or more of text 802, audio 804, and video 806 options for first user 706 to interact with first interactive avatar 716.

For example, as described above, first user 706 may engage with first interactive avatar 716 via text 802 by typing on a keyboard or touchscreen input associated with user interface 500, via audio 804 by speaking into a microphone or other audio sensor associated with user interface 500 to capture spoken words or input by first user 706, and/or via video 806 by using a video camera or other recording device associated with user interface 500 to allow first user 706 to speak and interact with first interactive avatar 716 during interactive session 800.

In various embodiments, interactive session 800 between first user 706 and first interactive avatar 716 of subject person 702 may include any discussion of topics or interests that first user 706 would like to discuss. For example, in this embodiment of interactive session 800, first user 706 has asked first interactive avatar 716 "What is your favorite color?" to which first interactive avatar 716 has responded "My favorite color is purple." The information or data used to generate the responses by first interactive avatar 716 during interactive session may be obtained from the data collection associated with the avatar stored in avatar database 116, described above. For example, the data collection may include at least one instance of text, audio, video, or image data where subject person 702 has stated that her favorite color is purple. Accordingly, system 100 may retrieve this information from avatar database 116 in order to allow first interactive avatar 716 of subject person 702 to answer the question from first user 706.

Interactive sessions may further include other representative topics. For example, in this embodiment of interactive session 800, subject person 702 is an actress and first user 706 has asked first interactive avatar 716 "Which movie was your favorite to work on?" to which first interactive avatar 716 has responded "All of them were fun, but my favorite was Avatar."

Additionally, as described above, in some embodiments, the interactive session between a user and the interactive digital avatar may be personalized or customized for the particular user, for example, using personalization data 310 stored in user database 118, described above. In this embodiment of interactive session 800, first user 706 has asked first interactive avatar 716 "Can you say 'Hi' to my mom, she's a big fan?" to which first interactive avatar 716 has responded "Hi, 'User 1's Mom!' Thanks for your support".

In an example embodiment, system 100 may use personalization data 310 stored in user database 118 for first user 706 to replace "User 1's Mom" in the response provided by first interactive avatar 716 with the actual name of first user 706's mom. In this case, the response by first interactive avatar 716 would appear to first user 706 as "Hi, Nancy! Thanks for your support" (i.e., where "Nancy" is the name of first user 706's mom obtained by system 100 from personalization data 310). With this arrangement, first user 706 may experience a uniquely personalized and customized interactive session 800 with first interactive avatar 716 of subject person 702.

In some embodiments, system 100 may use personalization data 310 of first user 706 to suggest calling or sending a message to a third person associated with first user 706 (e.g., a family member, friend, colleague, coworker, etc.) using first interactive avatar 716. For example, a friend of first user 706 may be a big fan of subject person 702 (e.g., which may be known from personalization data 310 of first user 706 stored in user database 118) and would be excited to be contacted by first interactive avatar 716 of subject person 702 to wish them a Happy Birthday or to receive some other type of personalized message or call. In addition, such third party interactions may help add additional users to system 100.

In other embodiments, an interactive session between a user and an interactive digital avatar of a subject person may be limited to a predetermined number of topics or responses. For example, system 100 may prepare and save in avatar database 116 for each avatar, a menu or list of potential questions and their associated responses that may be used during an interactive session with a subject person's avatar. The predetermined topics or responses may be obtained by processing and analyzing the data collection associated with the subject person and/or may be prepared in advance by the subject person.

Figure 9:
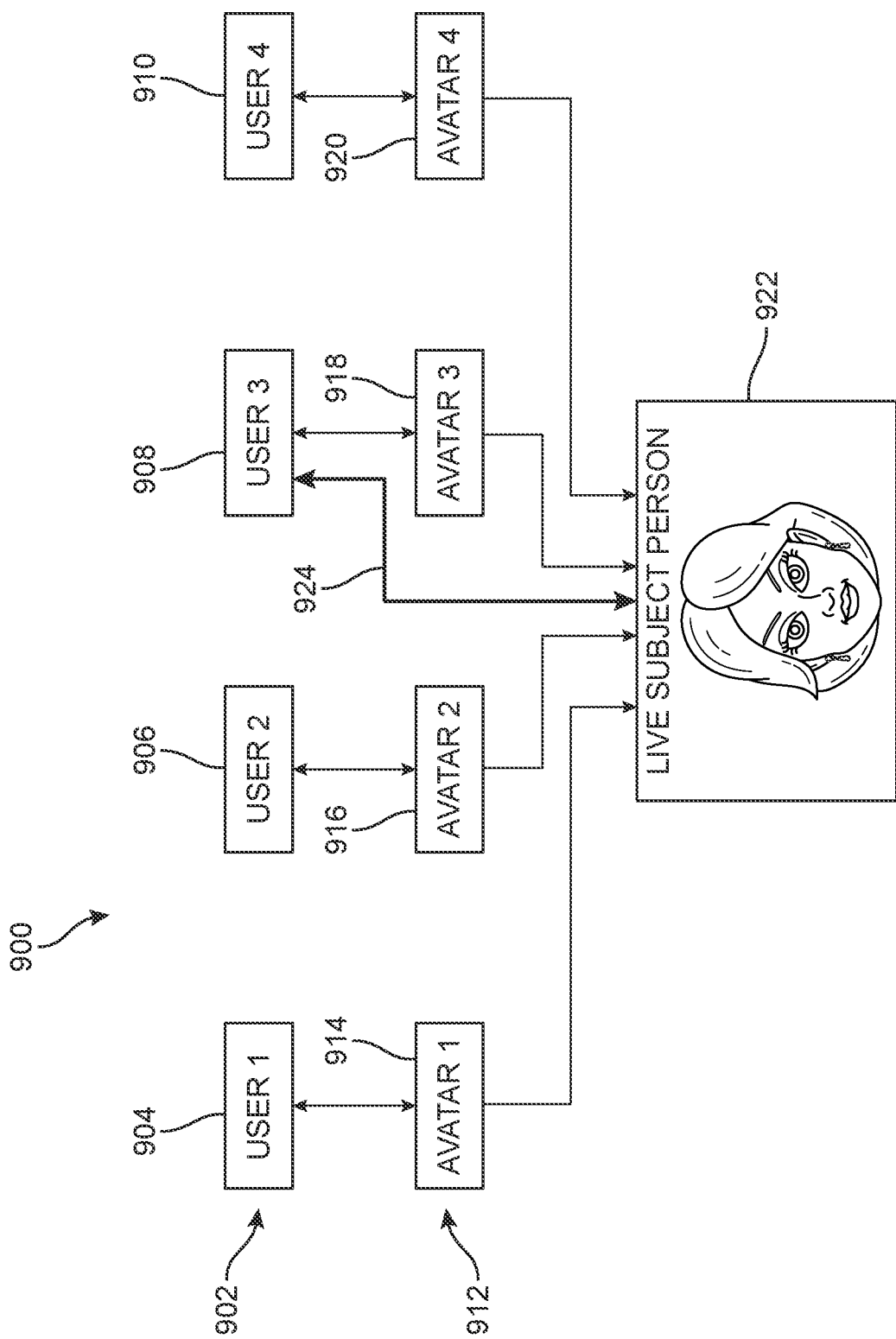
FIG. 9 is a representative view of an example embodiment of multiple users interacting with multiple interactive digitally rendered avatars of a subject person.

Referring now to FIG. 9, a representative view of an example embodiment of multiple users interacting with multiple interactive digitally rendered avatars of a subject person is shown. In this embodiment, a scenario 900 in which a plurality of users 902 are engaging with a plurality of interactive digitally rendered avatars 912 of a subject person 922 is shown. In this embodiment, each user of plurality of users 902, including a first user 904, a second user 906, a third user 908, and a fourth user 910 is engaging in an interactive session with their own unique instance of an interactive digitally rendered avatar of subject person 922. For example, as shown in FIG. 9, first user 904 is engaging in an interactive session with a first interactive avatar 914, second user 906 is engaging in an interactive session with a second interactive avatar 916, third user 908 is engaging in an interactive session with a third interactive avatar 918, and fourth user 910 is engaging in an interactive session with a fourth interactive avatar 920.

In this embodiment, each interactive avatar of plurality of interactive digitally rendered avatars 912 (e.g., first interactive avatar 914, second interactive avatar 916, third interactive avatar 918, and fourth interactive avatar 920) are representations of the same subject person, subject person 922 in this case. However, because each user of plurality of users 902 will ask different questions and otherwise engage with their own instance of the interactive digitally rendered avatar of subject person 922 in a different manner, each of the interactive sessions will be unique from each other.

In some embodiments, information associated with one or more interactive sessions between an interactive digital avatar of a subject person and one or more users (e.g., between plurality of interactive digitally rendered avatars 912 and plurality of users 902) may be obtained for storage and/or monitoring by system 100. For example, a summary of topics discussed, questions asked by users, answers given by interactive digital avatars, as well as information about session duration and/or connection quality may be provided back to system 100 for further analysis and storage, including, in some embodiments, stored as interaction data 314 in the associated user file of the user in user database 118, as described above.

In some embodiments, the actual subject person (e.g., subject person 922) may also be monitoring the one or more interactive sessions between the subject person's interactive digital avatar and one or more users (e.g., between plurality of interactive digitally rendered avatars 912 and plurality of users 902). For example, this may allow the subject person to determine what topics of conversation or other interests are being discussed with the interactive avatars. In addition, in some embodiments, a user may ask a question to the interactive digital avatar of the subject person for which a response is not known or not available based on the information in the data collection in avatar database 116. By monitoring the interactive sessions, the actual subject person may be alerted to such a question and may be able to provide a response.

In an example embodiment, system 100 allows a live subject person, such as subject person 922 in scenario 900, to enter or cut into an existing interactive session between the subject person's interactive digital avatar and a user. The live subject person may then engage directly with the user in a live session between the live subject person and the user. For example, as shown in FIG. 9, during an interactive session between third user 908 and third interactive avatar 918, live subject person 922 may enter or cut into the interactive session to establish a live session 924 directly between third user 908 and live subject person 922. With this arrangement, if third user 908 has brought up a topic that is interesting to subject person 922 monitoring the interactive session between third user 908 and third interactive avatar 918, subject person 922 may directly engage with third user 908 in live session 924 to further explore the topic or otherwise interact with third user 908 in real time.

Figure 10:
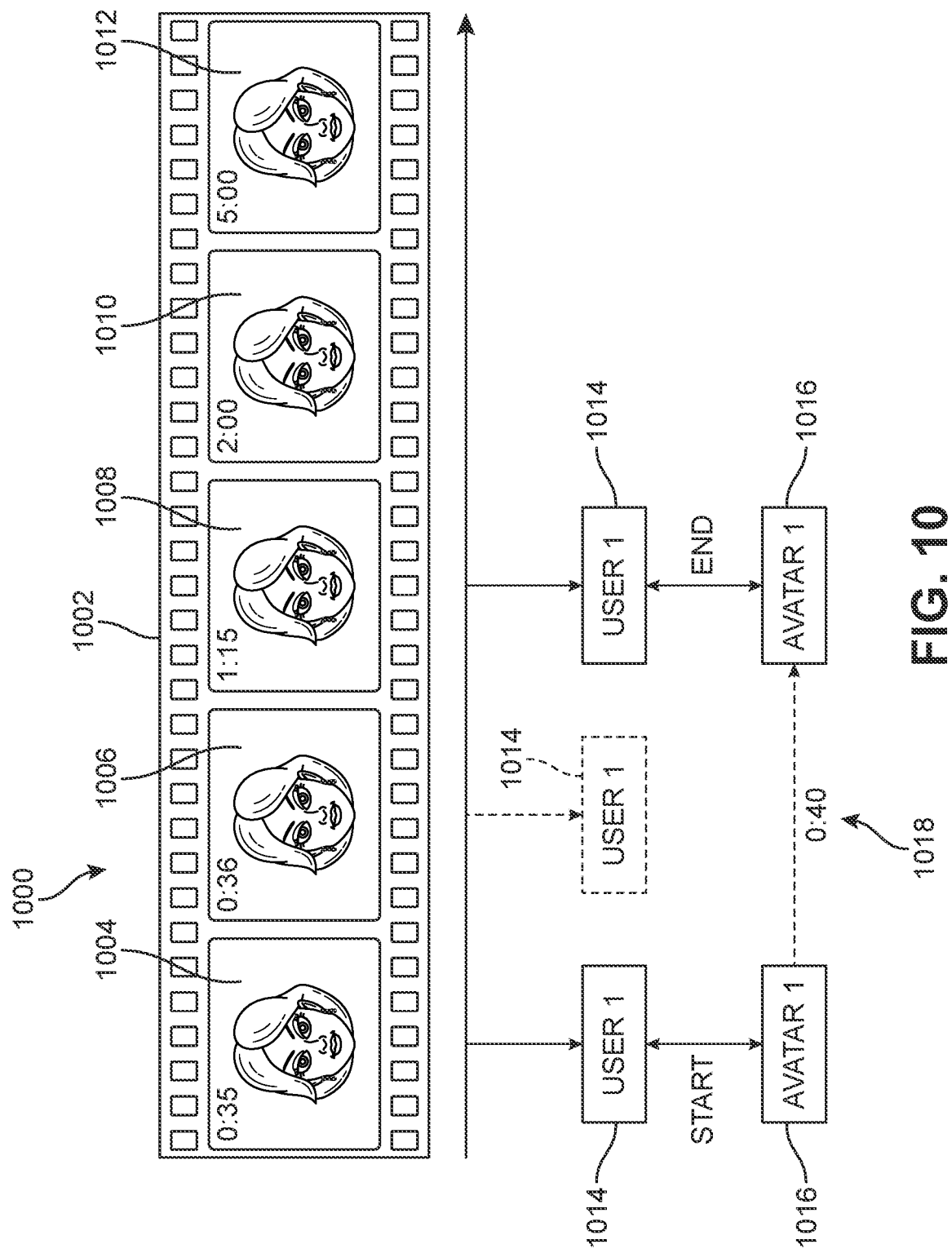
FIG. 10 is a representative view of an example embodiment of a user interacting with an interactive digitally rendered avatar of a subject person during a video.

Referring now to FIG. 10, a scenario 1000 of an example embodiment of a user 1014 interacting with an interactive digitally rendered avatar of a subject person featured in a video 1002 is shown. In this embodiment, user 1014 is watching video 1002 featuring a subject person. According to the techniques of the example embodiments described herein, at any time during scenario 1000, user 1014 may request to start an interactive session with an interactive digitally rendered avatar of the subject person featured in video 1002. For example, at a first time 1004 in video 1002 (e.g., at the 35 second mark of video 1002), user 1014 may start an interactive session with an interactive avatar 1016 of the subject person shown in video 1002 (i.e., shown at first time 1004, the 35 second mark, when user 1014 makes the request).

In this embodiment, user 1014 may continue to interact with interactive avatar 1016 during the interactive session for a period of time. For example, in scenario 1000 shown in FIG. 10, the interactive session between user 1014 and interactive avatar 1016 may last for a first period of time 1018 (e.g., 40 seconds). When the interactive session between user 1014 and interactive avatar 1016 ends after first period of time 1018, user 1014 may rejoin or continue with video 1002 at the corresponding time, such as a third time 1008 (e.g., at the 1 minute, 15 second mark) that has progressed from when user 1014 started the interactive session with interactive avatar 1016 (i.e., 40 seconds after first time 1004, the 35 second mark). The user 1014 may then continue with the remainder of video 1002.

Alternatively, in some embodiments, when the interactive session between user 1014 and interactive avatar 1016 ends after first period of time 1018, user 1014 may return to video 1002 at the next time after the interactive session began. For example, in this embodiment, user 1014 may return to video 1002 at a second time 1006 (e.g., the 36 second mark) that is directly after first time 1004 (e.g., the 35 second mark) when user 1014 made the request. With this arrangement, user 1014 may return back to the point in time of video 1002 from when the interactive session began.

It should be understood that user 1014 may engage in one or more subsequent interactive sessions with interactive avatar 1016 at other points of time in video 1002, including, but not limited to second time 1006, third time 1008, a fourth time 1010, and/or a fifth time 1012. After each interactive session with interactive avatar 1016, user 1014 may choose to return to the departure time in video 1002 or may rejoin video at a time that corresponds to the amount of real time that has progressed during each interactive session (e.g., first period of time 1018, shown in FIG. 10).

Figure 11:
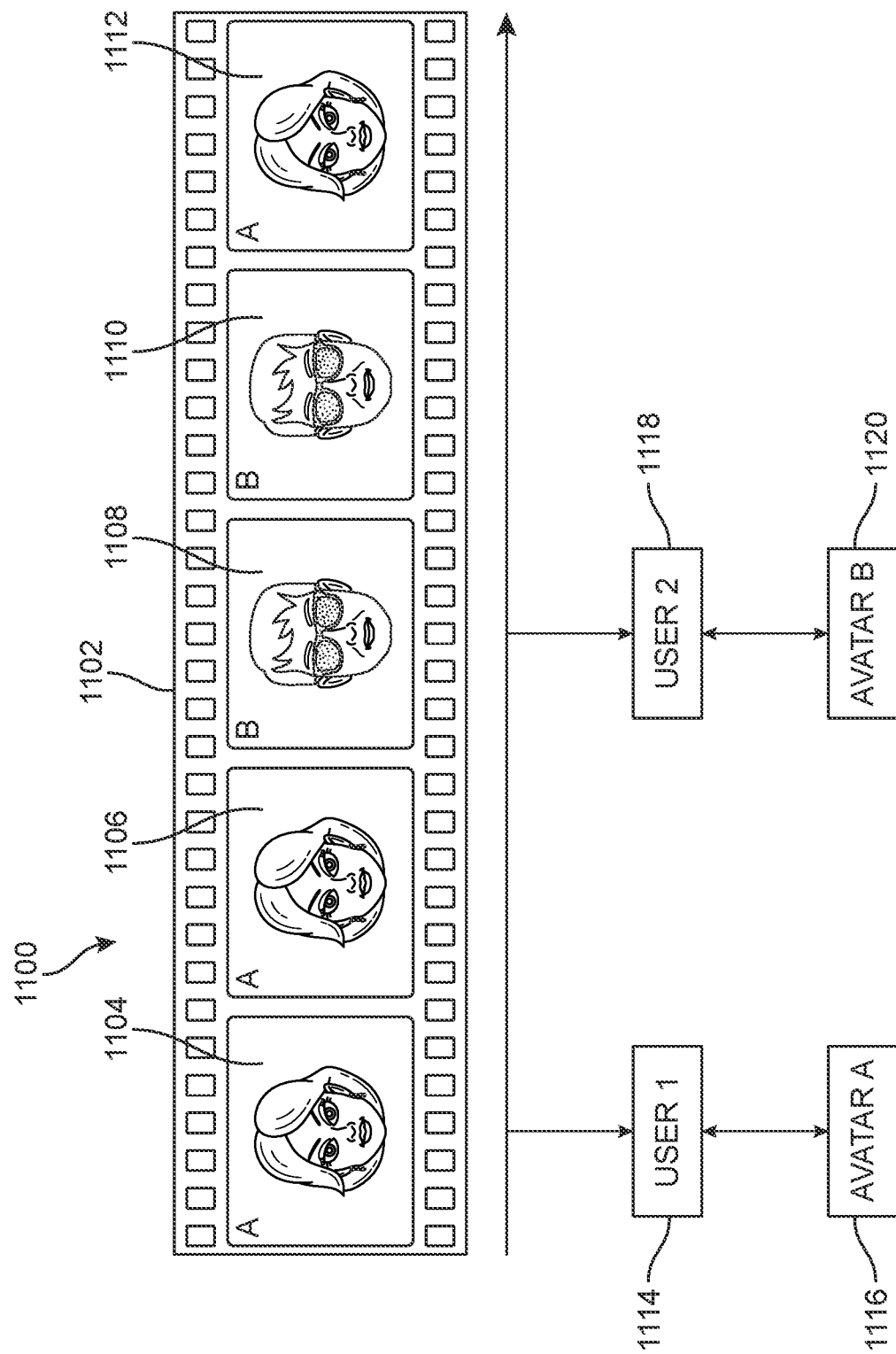
FIG. 11 is a representative view of an example embodiment of users interacting with multiple interactive digitally rendered avatars of different subject people during a video.

Referring now to FIG. 11, a scenario 1100 of an example embodiment of users interacting with multiple interactive digitally rendered avatars of different subject people during a video 1102 is shown. In some embodiments, a video, such as video 1102, may include multiple subject persons, each of which has an associated interactive digital avatar stored in avatar database 116. As shown in scenario 1100 of FIG. 11, video 1102 may include at least two different subject persons, subject person A and subject person B. It should be understood, however, that a video may include any number of subject persons who may have an associated interactive digital avatar in accordance with the example embodiments described herein. For example, the video may be a movie with dozens or more actors and actresses, a sporting event with many different athletes, a panel discussion or presentation with many different speakers or presenters, or any other type of live or prerecorded video with multiple subject persons.

In an example embodiment, during video 1102, one or more users may request to engage in an interactive session with an interactive digital avatar of subject person A, subject person B, or both. For example, in this embodiment, video 1102 at various times will feature or depict one or both of subject person A and subject person B. As shown in scenario 1100, subject person A is shown at a first time 1104 of video 1102, as well as at a second time 1106, and a fifth time 1112. Subject person B, who is a different subject person than subject person A, is shown at a third time 1108 and a fourth time 1110 of video 1102. It should be understood that additional subject persons may also be shown at various times of video 1102.

According to the techniques of the example embodiments described herein, a user of system 100 may request to initiate an interactive session with an interactive digital avatar of the subject person shown at any corresponding time during video 1102. For example, in scenario 1100, a first user 1114 is shown engaging in an interactive session with a first interactive avatar 1116 of subject person A by making the request during first time 1104 of video 1002 (i.e., when subject person A is featured or depicted). Meanwhile, a second user 1118 in scenario 1100 is also shown engaging in an interactive session with a second interactive avatar 1120 of subject person B by making the request during third time 1108 of video 1002 (i.e., when subject person B is featured or depicted). With this arrangement, two different users (e.g., first user 1114 and second user 1118) watching the same video (e.g., video 1102) may interact with different interactive digital avatars (e.g., first interactive avatar 1116 and second interactive avatar 1120) for different subject persons (e.g., subject person A and subject person B).

In the example embodiments described above, the interactive digital avatar was of a subject person that is a celebrity or other notable person. In some embodiments, system 100 and the associated method described herein may also be used to provide an interactive digital avatar of other types of subject persons or for other scenarios. For example, the techniques described herein may be used for any type of group presentations or other situations, including, but not limited to lectures, work or business presentations, school lessons, political town hall meetings, exercise or training classes, or other scenarios involving one or more subject persons interacting with a plurality of people through video (including broadcast, live streaming, pre-recorded, etc.). In these embodiments, the techniques described herein may be used to provide an interactive digital avatar of the subject person or subject persons to allow the plurality of people to individually interact with the interactive digital avatar in their own personalized interactive sessions.

Figure 12:
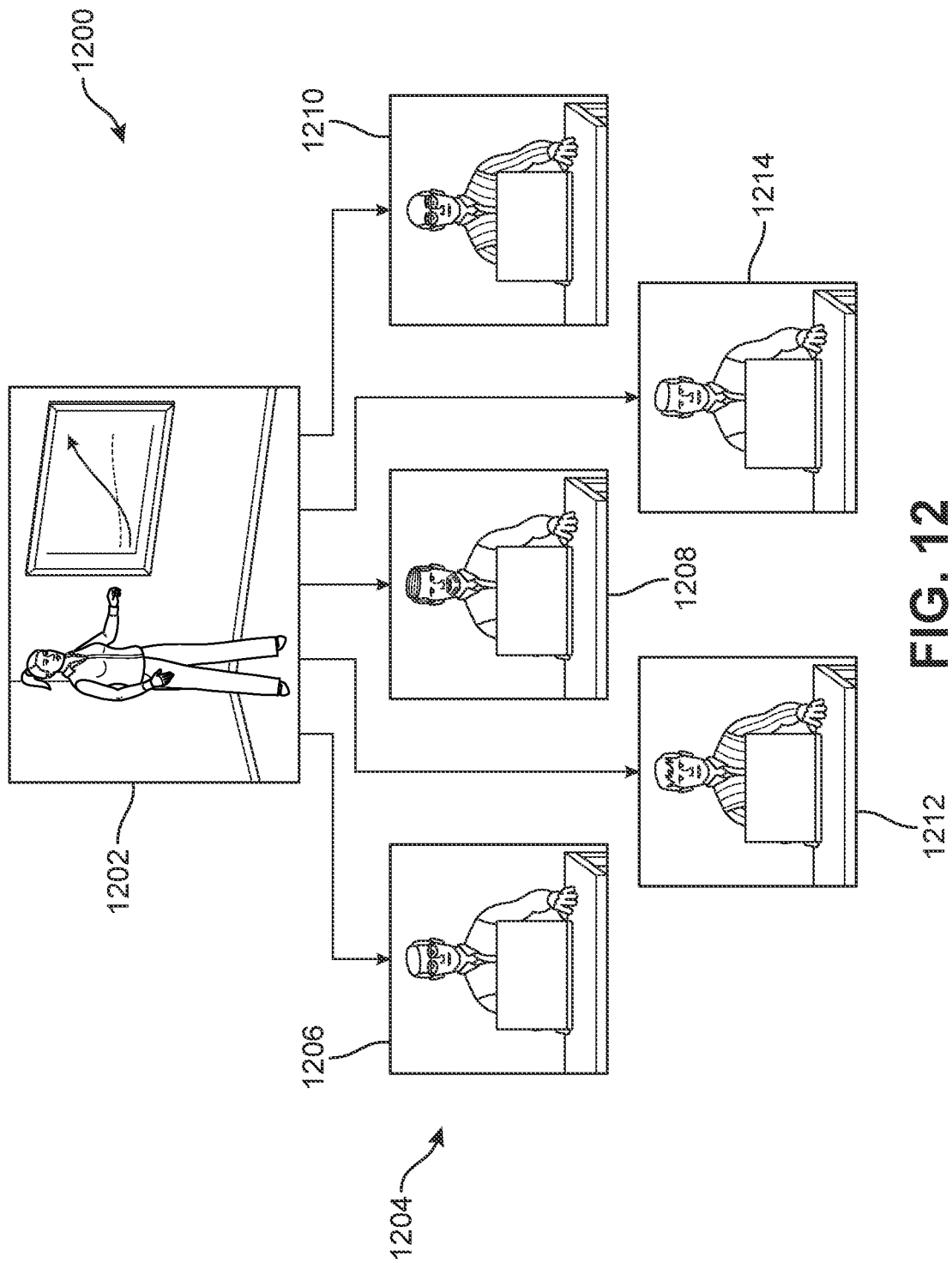
FIG. 12 is a representative view of an alternate embodiment of a subject person providing a group presentation to a plurality of users.
Figure 13:
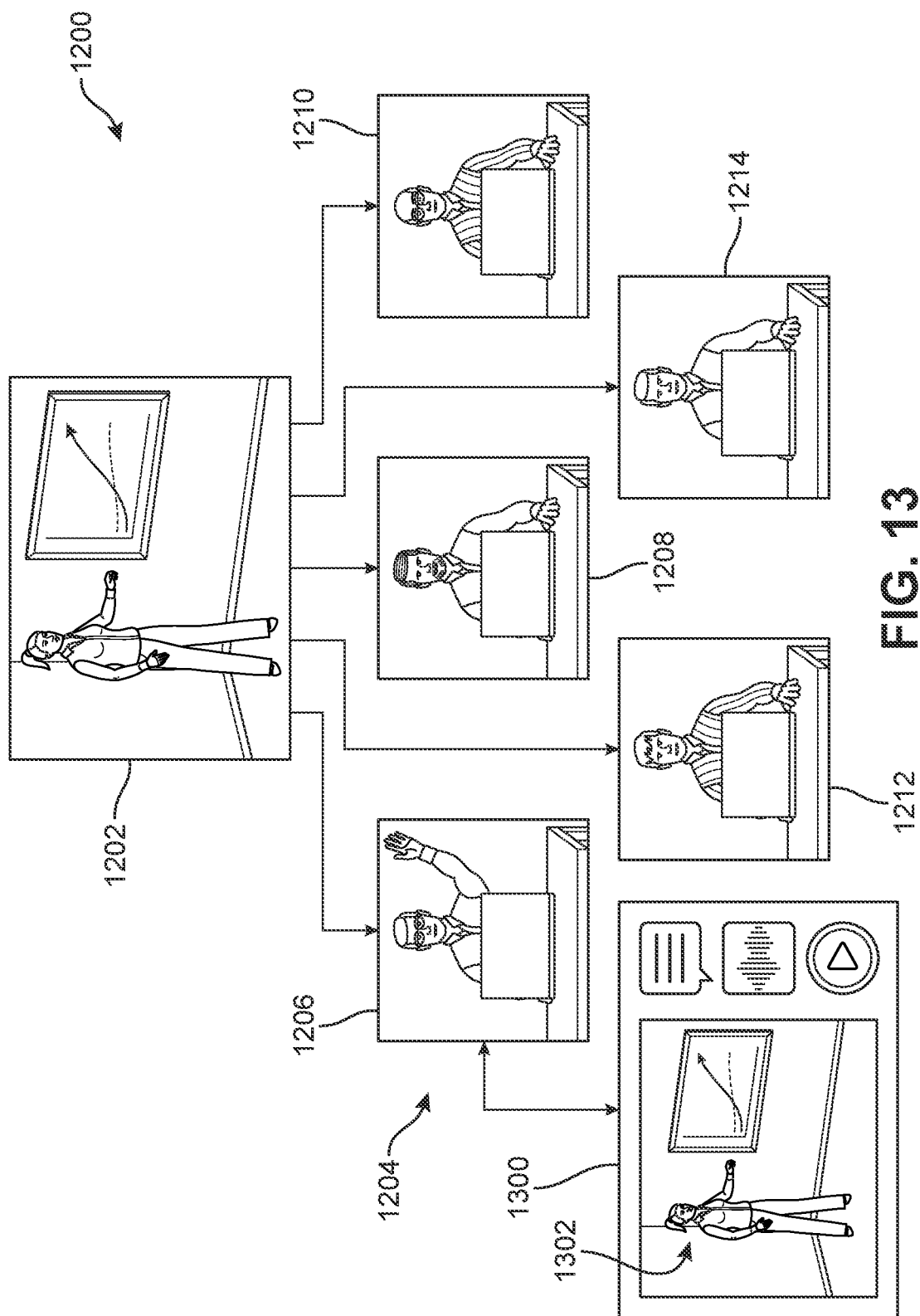
FIG. 13 is a representative view of an alternate embodiment of providing an interactive digitally rendered avatar of a subject person to a user for a group presentation.
Figure 14:
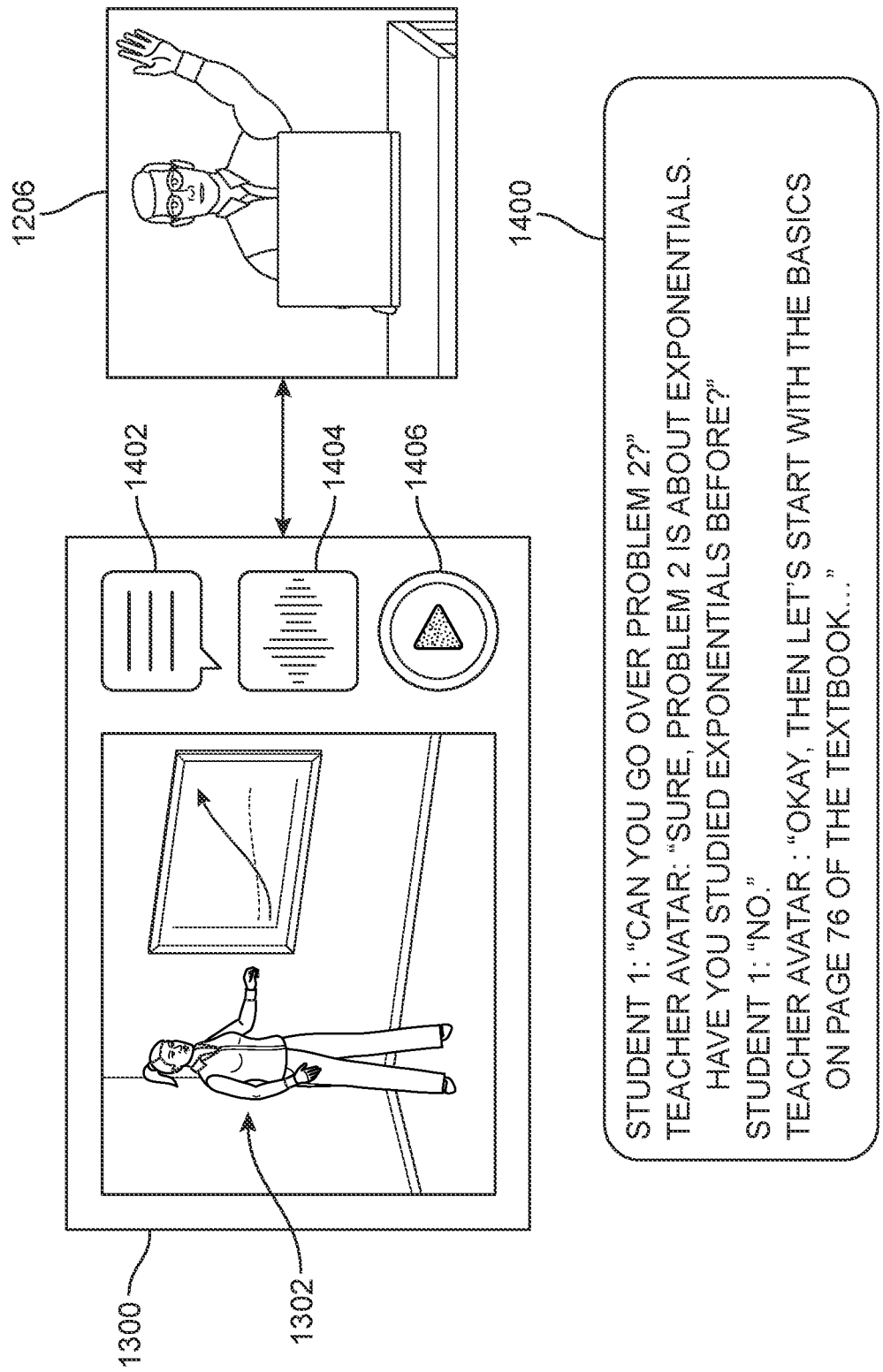
FIG. 14 is a detailed view of an alternate embodiment of an interaction between a user and an interactive digitally rendered avatar of a subject person for a group presentation.

FIGS. 12 through 14 below illustrate an alternate embodiment of using system 100 to provide an interactive digital avatar of a subject person in a group presentation or similar situation. Referring now to FIG. 12, a scenario 1200 of a subject person 1202 providing a group presentation to a plurality of users 1204 is shown. In this embodiment, scenario 1200 may be a lecture or lesson given by subject person 1202, who may be a professor or teacher, to plurality of users 1204, who may be students or pupils of subject person 1202.

In an example embodiment of scenario 1200, the lecture or lesson by subject person 1202 may be provided via a first communication format, such as a live or pre-recorded video that is broadcast or streamed to each user of plurality of users 1204, including a first user 1206, a second user 1208, a third user 1210, a fourth user 1212, and/or a fifth user 1214. As described above, at any time during the lecture or lesson by subject person 1202, one or more users of plurality of users 1204 may send or transmit a request to system 100 to initiate an interactive session with an avatar of subject person 1202 (e.g., as part of operation 604 of method 600, described above).

In some embodiments, system 100 may use input from user interface 500, such as one or more of gestures, facial expressions, or body language of a user captured by camera 508 and/or microphone 510 of user interface 500. For example, system 100 may use this input to analyze facial expressions of a user to determine that the user looks confused or distracted. In another example, system 100 may use the input to detect other types of gestures or actions, such as a user raising a hand or making other motions.

Referring now to FIG. 13, scenario 1200 is shown including an interactive digitally rendered avatar 1302 of subject person 1202 interacting with a first user 1206. In an example embodiment, subject person 1202 has an associated data collection stored in avatar database 116 of system 100 for an interactive digital avatar of subject person 1202. For example, the data collection stored in avatar database 116 may include one or more of audio data, video data, image data, or text data associated with subject person 1202 that allows AI engine 102 to generate an interactive digital avatar of subject person 1202, as described above. In scenario 1200, subject person 1202 is a teacher or professor and the data collection stored in avatar database 116 may include previous recorded lectures or lessons, as well as books, papers, presentations, etc. by subject person 1202.

According to the example embodiments, plurality of users 1204 may be located at different locations and may be using different devices (e.g., one or more types of user interfaces 500) to watch the video featuring subject person 1202. In an example embodiment, when at least one user of plurality of users 1204 would like to interact with a digital avatar of subject person 1202 during the video, that user may send or transmit a request to system 100 to initiate an interactive session with an avatar of subject person 1202 (e.g., as part of operation 604 of method 600, described above).

In this embodiment, first user 1206 has made a request to start an interactive session with a digital avatar of subject person 1202. In some embodiments, first user 1206 may initiate the interactive session through their user interface (e.g., one of user interfaces 500, described above) or system 100 may detect facial expressions or gestures made by first user 1206 that indicate that first user 1206 would like to initiate an interactive session. For example, in this embodiment, first user 1206 has raised his hand, which gesture or motion may be detected by system 100 using camera 508 of user interface 500, to request to start the interactive session with a digital avatar of subject person 1202. Additionally, any of the types of gestures, facial expressions, or actions described with reference to FIG. 17 below may be used as a request to initiate an interactive session with an avatar in accordance with the exemplary embodiments described herein.

In response, system 100 generates and renders interactive avatar 1302 through an avatar interface 1300 to allow first user 1206 to interact with interactive avatar 1302 of subject person 1202. In contrast to the video from subject person 1202 to plurality of users 1204 (which may be a one-way communication, such as a broadcast or stream), the interactive session between first user 1206 and interactive avatar 1302 is a two-way communication that allows text, audio, and/or video to be transmitted and received in a bi-directional manner between first user 1206 and interactive avatar 1302. For example, in one embodiment, the two-way communication between first user 1206 and interactive avatar 1302 may be provided through avatar interface 1300 and at least one user interface 500 associated with first user 1206 (e.g., a laptop computer in scenario 1200).

Additionally, any of the other users of plurality of users 1204 may also separately, simultaneously, or concurrently request to start their own interactive session with a digital avatar of subject person 1202. In response to each such request, system 100 may generate and render additional instances of interactive digital avatars of subject person 1202 to interact with each additional user making a request, as described above in reference to the example embodiments.

Referring now to FIG. 14, a detailed view of an example embodiment of an interaction between a user and an interactive digitally rendered avatar of a subject person is shown. In this embodiment, a representative interactive session 1400 between first user 1206 and interactive avatar 1302 of subject person 1202 is shown. In an example embodiment, communication during interactive session 1400 between interactive avatar 1302 and first user 1206 may be made through avatar interface 1300 which may be provided on at least one type of user interface 500 associated with first user 1206. In this embodiment, avatar interface 1300 includes one or more of text 1402, audio 1404, and video 1406 options for first user 1206 to interact with interactive avatar 1302.

For example, first user 1206 may engage with interactive avatar 1302 via text 1402 by typing on a keyboard or touchscreen input associated with user interface 500, via audio 1404 by speaking into a microphone or other audio sensor associated with user interface 500 to capture spoken words or input by first user 1206, and/or via video 1406 by using a video camera or other recording device associated with user interface 500 to allow first user 1206 to speak and interact with interactive avatar 1302 during interactive session 1400.

In various embodiments, interactive session 1400 between first user 1206 and interactive avatar 1302 of subject person 1202 may include any discussion of topics or interests that first user 1206 would like to discuss. For example, in this embodiment of interactive session 1400, first user 1206 may interact with interactive avatar 1302 of subject person 1202 to ask questions about the lecture or lesson provided by subject person 1202 on the video. As shown in FIG. 14, first user 1206 has asked interactive avatar 1302 "Can you go over Problem 2?" to which interactive avatar 1302 (e.g., "Teacher Avatar" response in FIG. 14) has responded "Sure, Problem 2 is about Exponentials. Have you studied Exponentials before?" That is, the potential responses or interactions by interactive avatar 1302 with first user 1206 may be shaped or based on an ascertained skill level of first user 1206. In some embodiments, the skill level of first user 1206 may also be stored in the user file for first user 1206 stored in user database 118. For example, the user file may include the student's history, test results, grades, indicate previous classes attended, grades for other courses, etc. so that interactive avatar 1302 may determine the skill level of first user 1206 and base its responses on the skill level of first user 1206.

In this embodiment, first user 1206 responds "No" and, based on this response, interactive avatar 1302 responds "Okay, then let's start with the basics on page 76 of the textbook . . . ." That is, in this example of interactive session 1400, interactive avatar 1302 has determined the skill level of first user 1206 (e.g., based on the response to the question of whether first user 1206 had studied exponentials before) and has shaped or based its response (e.g., "then let's start with the basics on page 76 of the textbook") on the ascertained skill level in order to personalize or customize interactive session 1400 to the particular situation of first user 1206.

As described in previous embodiments, the information or data used to generate the responses by interactive avatar 1302 during interactive session 1400 may be obtained from the data collection associated with the avatar stored in avatar database 116, described above. For example, the data collection may include at least one instance of text, audio, video, or image data where subject person 1202 has previously taught or given assistance with the subject of exponentials. Accordingly, system 100 may retrieve this information from avatar database 116 in order to allow interactive avatar 1302 of subject person 1202 to answer questions and provide help to first user 1206.

Additionally, as described above, in some embodiments, the topics, responses, and other information provided during interactive session 1400 between first user 1206 and interactive avatar 1302 of subject person 1202 may be stored in the user file for first user 1206 (e.g., as interaction data 314) and may also be provided back to subject person 1202. For example, subject person 1202 may use the information about one or more interactions between plurality of users 1204 and interactive avatars to identify users that need further assistance with certain topics or to identify areas of the lecture or lesson that are difficult for many users of plurality of users 1204 to understand. That is, by monitoring or analyzing the interactions between plurality of users 1204 and interactive avatars, subject person 1202 may use this feedback to modify or improve her lecture or lesson.

Figure 15:
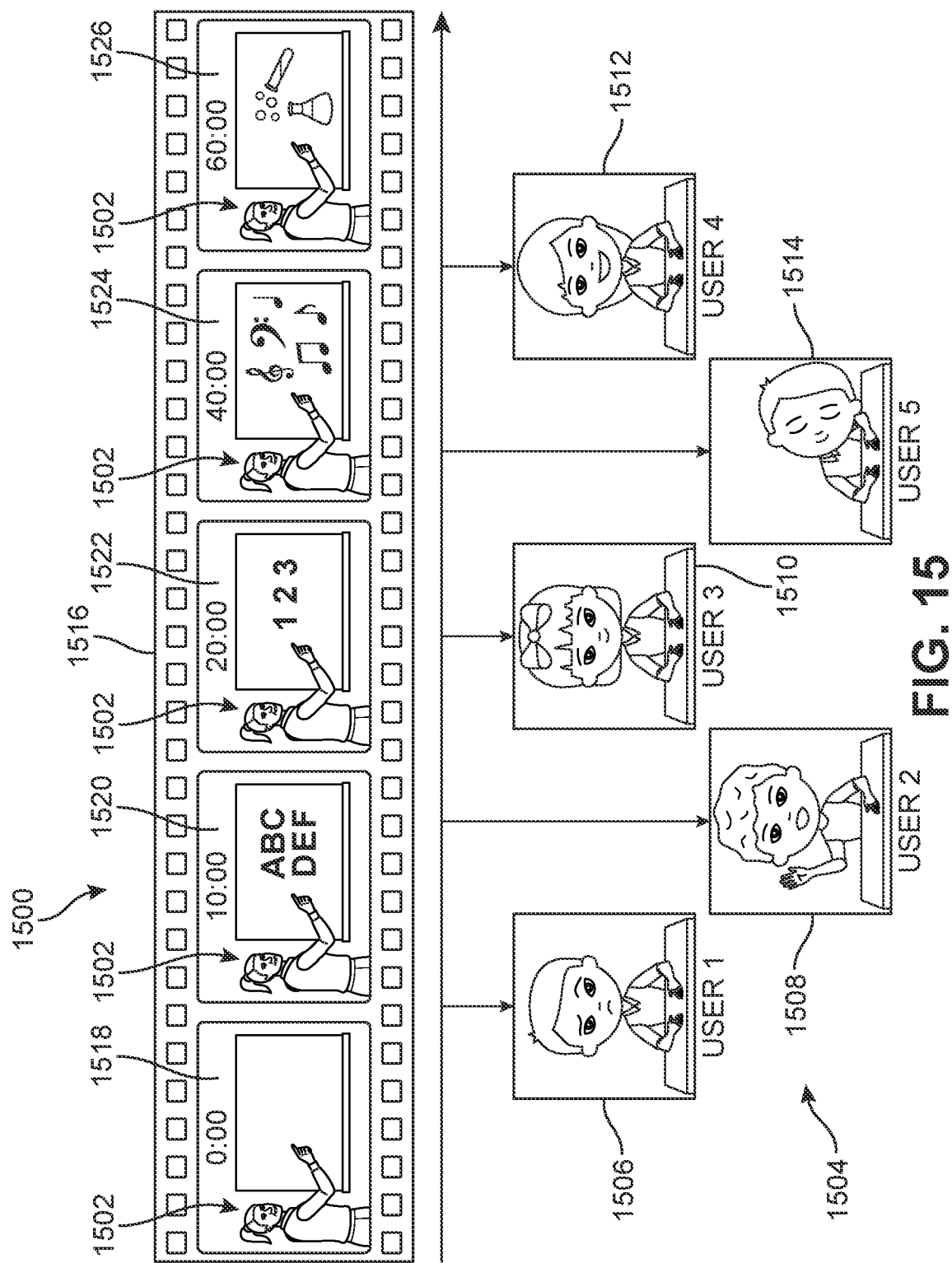
FIG. 15 is a representative view of an example embodiment of users providing feedback during a group presentation by a subject person.

In some embodiments, the techniques of the present embodiments described herein may be used to detect and collect feedback from one or more users of system 100 during a group presentation, live or recorded video, speech, lecture, or other type of performance or address. FIGS. 15-18 illustrate an example embodiment of users providing feedback during a group presentation by a subject person or similar situation. Referring now to FIG. 15, a scenario 1500 of a subject person 1502 providing a group presentation to a plurality of users 1504 is shown. In this embodiment, scenario 1500 may be a lecture or lesson given by subject person 1502, who may be a professor or teacher, to plurality of users 1504, who may be students or pupils of subject person 1502. As shown in FIG. 15, plurality of users 1504 includes a first user 1506, a second user 1508, a third user 1510, a fourth user 1512, and a fifth user 1514. In other embodiments, however, plurality of users 1504 may include any number of users.

It should be understood that the techniques associated with detecting and collecting feedback from users as described with reference to the example embodiments of FIGS. 15-18 may be used in connection with other scenarios that include one or more subject persons providing a group presentation, including a live or recorded presentation, to a plurality of users, such as, for example, in connection with training, guest speaker(s)/lecturer(s), how-to-videos, debates, etc.

Figure 16:
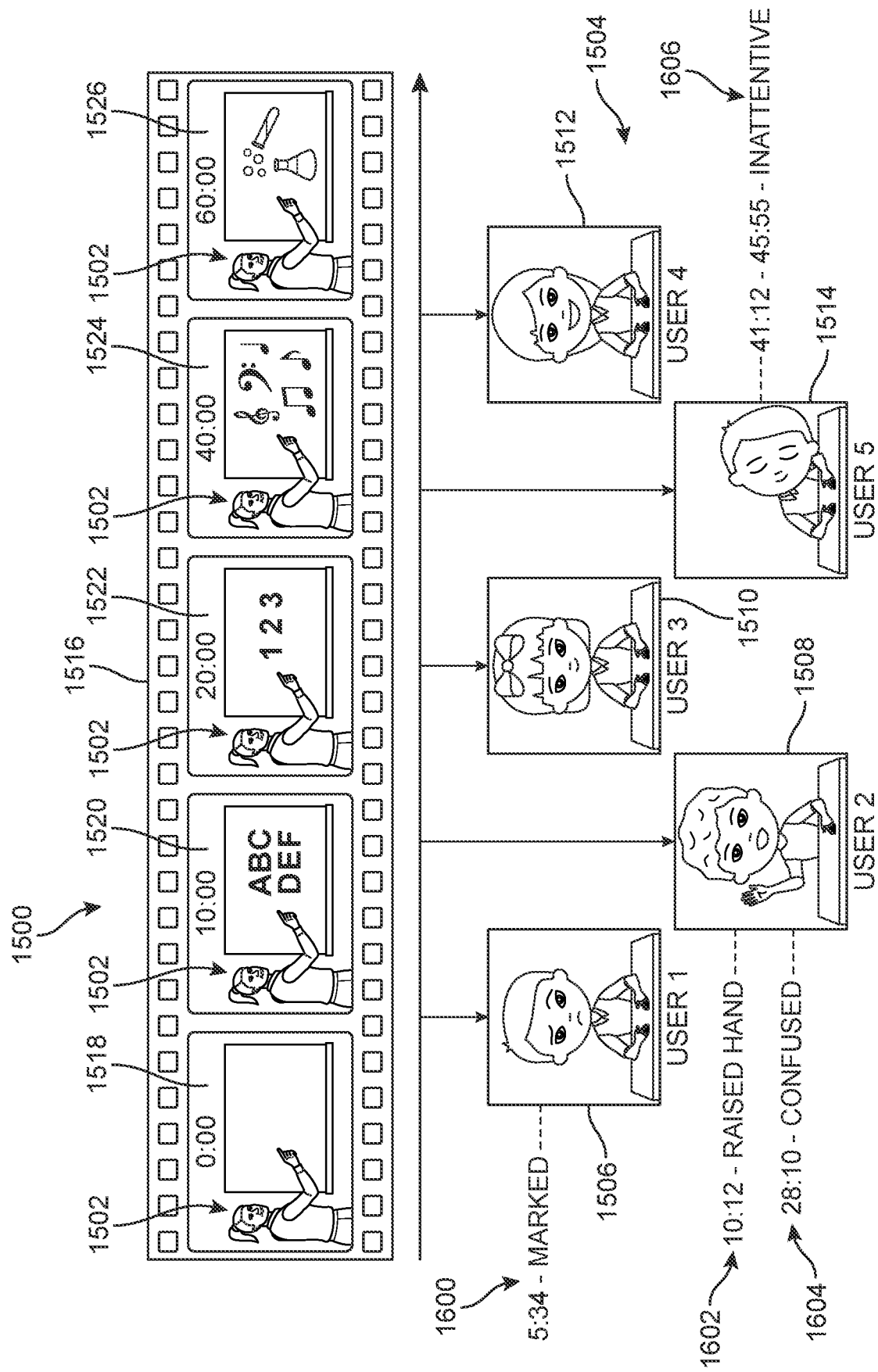
FIG. 16 is a representative view of examples of different feedback from users provided during a group presentation by a subject person.

In an example embodiment, scenario 1500 includes subject person 1502 providing a group presentation in the form of a lesson 1516 to plurality of users 1504. In this embodiment, lesson 1516 includes one or more distinct parts or portions that cover different subjects or topics. For example, as shown in FIG. 16, lesson 1516 includes a first portion 1518 covering a beginning or introduction, a second portion 1520 discussing spelling and/or grammar, a third portion 1522 discussing mathematics, a fourth portion 1524 directed to music, and a fifth portion 1526 discussing science or chemistry. It should be understood that lesson 1516 is merely exemplary and a group presentation may include any number of parts or portions covering any types of subjects or topics.

In some embodiments, system 100 may be used to detect and collect feedback from plurality of users 1504 during lesson 1516. For example, as described above, in one embodiment, system 100 may use input from user interface 500 to detect user feedback. User feedback may be direct, such as feedback spoken, typed, written, clicked, selected, or otherwise input directly into user interface 500 by the user, as well as indirect feedback, such as one or more of gestures, facial expressions, or body language of a user captured by camera 508 and/or microphone 510 of user interface 500. Gestures may include any movements or motions made by a head, face, hand, finger(s), arm, hips, legs, feet or other part of the user.

Referring again to FIG. 16, system 100 detects and collects different feedback from plurality of users 1504 provided to subject person 1502 during a group presentation, for example, lesson 1516. Over the course of lesson 1516, one or more of plurality of users 1504 may have direct and/or indirect feedback that relate to the different parts or portions of lesson 1516. For example, the feedback detected and collected from plurality of users 1504 may indicate how well received, interesting, confusing, liked, disliked, effective, or ineffective parts or portions of lesson 1516 are to the audience (e.g., plurality of users 1504). Additionally, some users may choose to mark or flag a portion of lesson 1516 for follow up, such as to review after the group presentation is over, to follow up with specific questions regarding that portion of the presentation, or to request tutoring or additional help with the subject or topic.

In this embodiment, during various portions of lesson 1516 one or more users of plurality of users 1504 have provided direct or indirect feedback that is detected and collected by system 100. For example, as shown in FIG. 16, during first portion 1518 of lesson 1516 (e.g., at a timestamp 5:34 of lesson 1516), first user 1506 has provided feedback 1600 in the form of marking that portion of lesson 1516. In this embodiment, feedback 1600 is direct feedback. For example, in some embodiments, first user 1506 may mark first portion 1518 of lesson 1516 via an input through user interface 500, such as with a keyboard, mouse, stylus, touchscreen input, or other input device, to mark or flag first portion 1518 for follow up or review after lesson 1516 has concluded.

Also shown in FIG. 16, second user 1508 has provided feedback for several portions of lesson 1516, including a first feedback 1602 during second portion 1520 of lesson 1516 (e.g., at a timestamp 10:12 of lesson 1516) and a second feedback 1604 during third portion 1522 of lesson 1516 (e.g., at a timestamp 28:10 of lesson 1516). In this embodiment, both of first feedback 1602 and second feedback 1604 provided by second user 1508 is indirect feedback that is captured by user interface 500 and recognized using an algorithm of a processor of system 100 and/or user interface 500. For example, first feedback 1602 is in the form of a raised hand by second user 1508 and second feedback 1604 is in the form of a confused facial expression made by second user 1508.

Additionally, as shown in FIG. 16, during fourth portion 1524 of lesson 1516, fifth user 1514 has provided feedback 1606 (e.g., over a time period starting at a timestamp 41:12 to a timestamp 45:55 of lesson 1516). In this embodiment, feedback 1606 is indirect feedback in the form of fifth user 1514 being inattentive during an extended period of timer during lesson 1516. For example, as shown in FIG. 16, fifth user 1514 has their head resting on the desk with closed eyes. This gesture made by fifth user 1514 is captured and recognized as being an inattentive facial expression or gesture using an algorithm of a processor of system 100 and/or user interface 500. It should be understood that the examples of direct and indirect feedback (e.g., 1600, 1602, 1604, 1606) described in reference to FIG. 16 are representative and during a group presentation, such as lesson 1516, any number of direct and/or indirect feedback may be provided by plurality of users 1504, including more than is shown in the example of FIG. 16.

In some embodiments, feedback detected from one or more users, including direct or indirect feedback, during a group presentation may be provided to each user in real time during the group presentation as live feedback, for example, direct and indirect feedback 1600, 1602, 1604, 1606, described above. In an example embodiment, the live feedback from each user may be provided on the user's corresponding user interface (e.g., user interface 500) while the group presentation is ongoing. With this arrangement, each user may monitor their own live feedback during the group presentation and may adjust, modify, or change their gestures, facial expressions, or body language during the live group presentation based on their live feedback to better show or indicate their engagement or level of attention to the topics or subject matter being discussed in the presentation.

In one embodiment, system 100 may be used to detect and collect feedback from each user of plurality of users 1504 during lesson 1516 in real time and immediately provide the live (i.e., real time) feedback the corresponding user or users during the presentation or lesson. For example, as described above, in one embodiment, system 100 may use input from user interface 500 to detect user feedback. User feedback may be direct, such as feedback spoken, typed, written, clicked, selected, or otherwise input directly into user interface 500 by the user, as well as indirect feedback, such as one or more of gestures, facial expressions, or body language of a user captured by camera 508 and/or microphone 510 of user interface 500. Gestures may include any movements or motions made by a head, face, hand, finger(s), arm, hips, legs, feet or other part of the user.

For example, as described in FIG. 16, system 100 has detected feedback from second user 1508 for several portions of lesson 1516, including a first feedback 1602 during second portion 1520 of lesson 1516 (e.g., at a timestamp 10:12 of lesson 1516) and a second feedback 1604 during third portion 1522 of lesson 1516 (e.g., at a timestamp 28:10 of lesson 1516). In this embodiment, both of first feedback 1602 and second feedback 1604 detected from second user 1508 may be immediately provided to second user via user interface 500. In this example, first feedback 1602 is in the form of a raised hand and second feedback 1604 is in the form of a confused facial expression. According to this embodiment, first feedback 1602 during second portion 1520 of lesson 1516 is detected and provided immediately on user interface 500 associated with second user 1508 (e.g., corresponding to timestamp 10:12 of lesson 1516). Similarly, second feedback 1604 during third portion 1522 of lesson 1516 is detected and provided immediately on user interface 500 associated with second user 1508 (e.g., corresponding to timestamp 28:10 of lesson 1516).

When the user receives their own live feedback during the presentation (e.g., lesson 1516), the user may choose to better show or indicate their engagement or level of attention to the topics or subject matter being discussed in the presentation. In some embodiments, in response to the live feedback, the user may request an interactive session with an avatar of the subject person providing the presentation while the presentation is still ongoing. With this arrangement, rather than waiting until the presentation is over to receive or request a tutoring session or additional review of the topics or subject matter being discussed, the user may immediately request an interactive session with an avatar to ask questions to be able to better understand the topic or subject matter during the presentation. The user may then have an improved understanding of the rest of the presentation.

In various embodiments, the live feedback provided to each user, for example, via user interface 500, may take different forms. In some cases, the live feedback may be provided as text indicating the relevant portion of the presentation (e.g., by timestamp or topic) with which the feedback is associated as well as the type of direct or indirect feedback detected. In other cases, the live feedback may be provided in the form of images or icons (e.g., emojis or other representational graphics) that are displayed on user interface 500. In still other cases, the live feedback may be displayed on user interface 500 in the form of a sliding scale or other representation that detects an overall feedback score in real time during the presentation.

For example, detected gestures, facial expressions, or body language that indicate confusion or inattentiveness may decrease the overall feedback score, whereas detected gestures, facial expressions, or body language that indicate engagement or understanding, such as participating in the presentation, maintaining eye contact, having good body posture, etc. may increase the overall feedback score. Other formulas or criteria may be applied to the detected feedback from each user to determine or calculate an overall feedback score in real time during the presentation. With this arrangement, each user may be provided with a mechanism that allows them to monitor their own intentional or unintentional reactions and responses to the topics or subject matter being discussed during the presentation.

Figure 17:
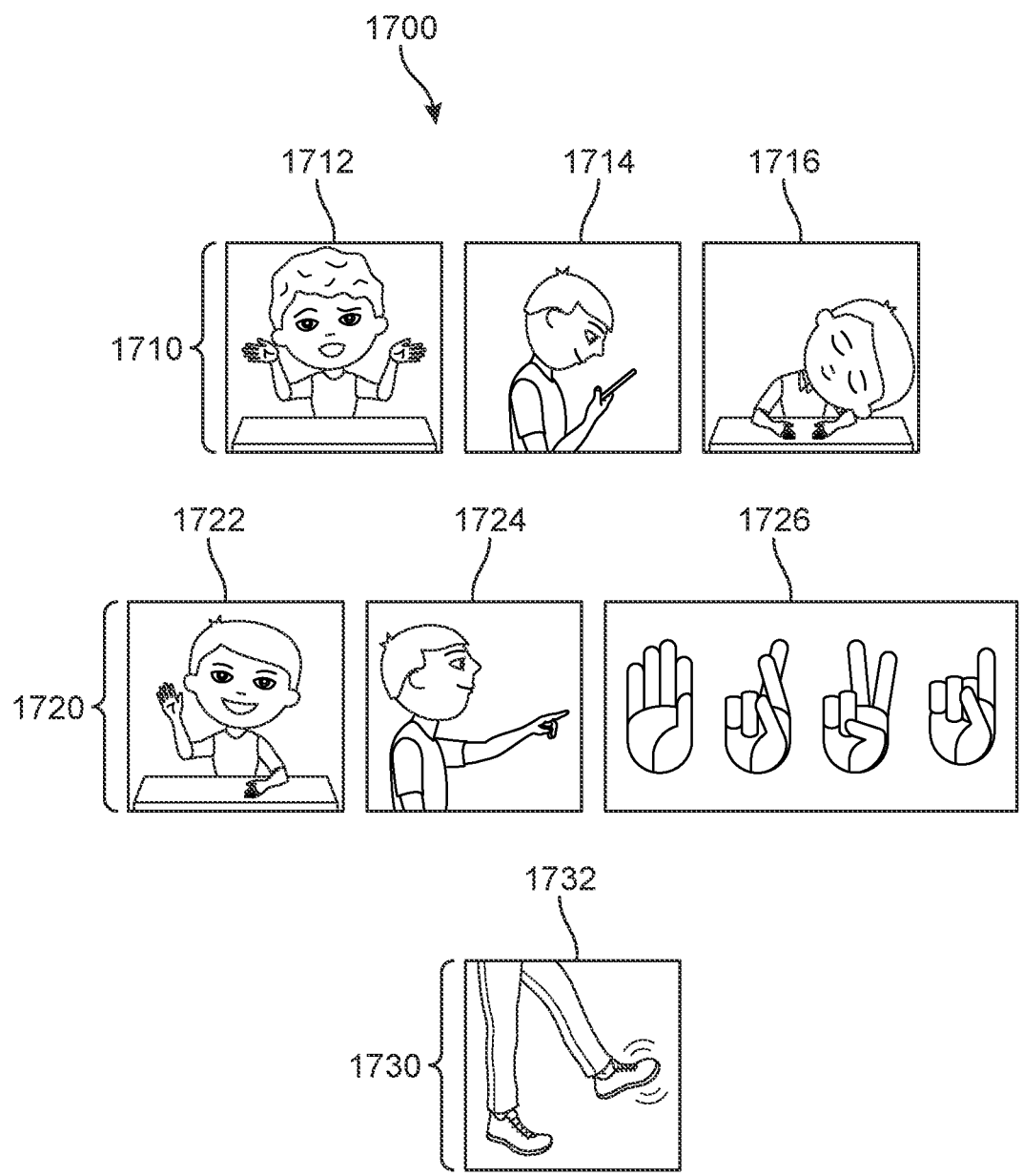
FIG. 17 illustrates exemplary types of gestures that may be provided as feedback by users during a group presentation by a subject person.

Referring now to FIG. 17, a variety of exemplary types of gestures, facial expressions, or actions that may be detected as feedback 1700 by users during a group presentation by a subject person are shown. It should be understood that the examples of feedback 1700 shown in FIG. 17 are non-limiting and may include any number of different types and/or forms of feedback that may be directly or indirectly detected. For example, as described above feedback from users may be detected or captured using user interface 500, including camera 508, microphone 510, as well as any other type of input devices 512, such as a keyboard, mouse, touchscreen, touchpad, stylus, buttons, etc.

In some embodiments, one or more processors, including, but not limited to processors 104 of AI engine 102 of system 100 and/or processor 502 of user interface 500, may execute gesture recognition and/or facial recognition algorithms that are configured to analyze the captured video or images from camera 508 of user interface 500 to detect and recognize the gestures made by the user to provide the detection and collection of feedback described herein.

In an example embodiment, feedback 1700 includes several different categories or types of feedback, including, but not limited to a first group 1710 of feedback associated with facial expressions, a second group 1720 of feedback associated with hand or finger gestures or motions, and a third group 1730 of feedback associated with foot or leg gestures or motions. In this embodiment, first group 1710 of feedback associated with facial expressions includes a first facial expression 1712 that indicates confusion, a second facial expression 1714 that indicates distraction, and a third facial expression 1716 that indicates inattention. First group 1710 may further include any number of other types or forms of facial expressions, such as surprise, anger, sadness, happiness, anxiety, impatience, annoyance, or other expressions.

Second group 1720 of feedback associated with hand or finger gestures or motions includes a first hand motion 1722 of raising a hand, a second hand motion 1724 of pointing a finger, and a third hand motion 1726 of various sign language signs made with a user's hands and fingers. Second group 1720 may further include any number of other types or forms of hand or finger gestures or motions, such as a thumbs up, a peace sign, clenched fists, or other hand or finger gestures or motions. Third group 1730 includes a first foot motion 1732 of moving or shaking a foot. Third group 1730 may further include any number of other types or forms of foot or leg gestures or motions, such as crossing legs, tapping one or both feet, stretching out legs, or other foot or leg gestures or motions.

In this embodiment, three exemplary categories or types of feedback 1700 are shown (e.g., facial expressions, hand/finger gestures, and foot/leg gestures). In other embodiments, the categories or types of feedback may be particularly selected based on the nature or type of group presentation or video. For example, a training video for dance may include not only feedback associated with foot gestures, but may also include hip movement or motion and shoulder movements in order to provide relevant feedback on the training video.

Figure 18:
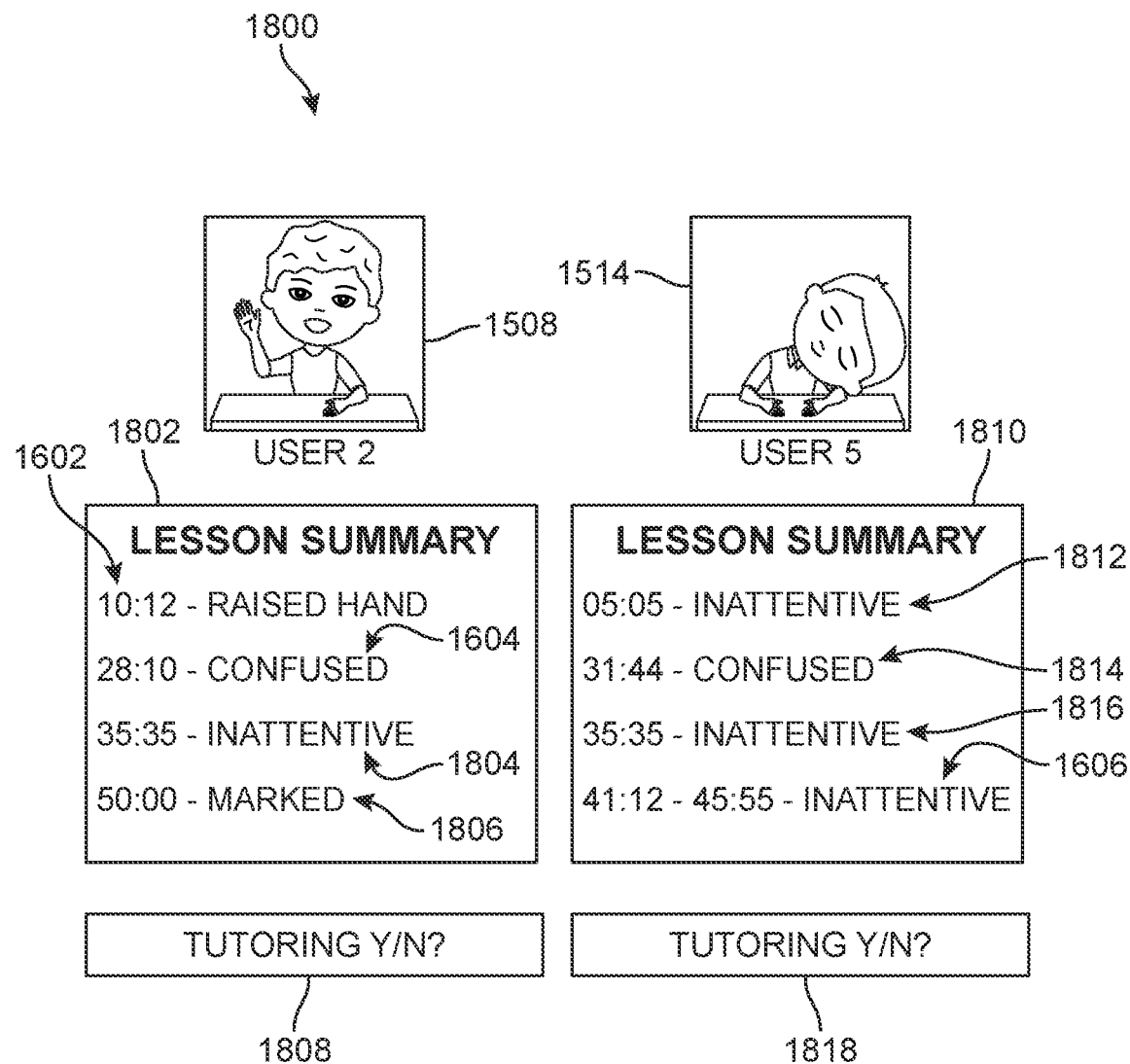
FIG. 18 is an example embodiment of feedback summaries provided to users summarizing feedback from the users during a group presentation.

In some embodiments, the user feedback detected and collected during a group presentation (e.g., during lesson 1516 above) may be provided as a summary to each user of plurality of users 1504 participating in the group presentation. Referring now to FIG. 18, an example embodiment of feedback summaries 1800 provided to users summarizing feedback from the users during a group presentation is shown. In an example embodiment, feedback summaries 1800 may include a breakdown of the direct or indirect feedback from each user of plurality of users 1504 detected during each of the one or more distinct parts or portions of the group presentation. For example, in this embodiment, feedback summaries 1800 include a summary of the individual feedback from second user 1508 and fifth user 1514 of plurality of users 1504 provided during lesson 1516 given by subject person 1502. It should be understood that feedback summaries 1800 may include any number of summaries of individual feedback provided by any number of users during a group presentation.

In some embodiments, feedback summaries 1800 include an identification of the different types of direct or indirect feedback detected and collected during each portion of the group presentation (e.g., portions 1520, 1522, 1524, 1526 of lesson 1516). For example, in this embodiment, the type of feedback included in feedback summaries 1800 includes direct feedback, as well as indirect feedback such as gestures, motions, or facial expressions that indicate a user was distracted, confused, or had questions.

In this embodiment, feedback summaries 1800 for plurality of users 1504 includes at least a first summary 1802 for second user 1508 and a second summary 1810 for fifth user 1514. In an example embodiment, each feedback summary (e.g., first summary 1802 and second summary 1810) includes details of the feedback provided by each user during a group presentation, such as lesson 1516. In some embodiments, a feedback summary may include identification of the feedback, including the type of feedback, and the time during the group presentation that the feedback was detected. For example, first summary 1802 of the feedback from second user 1508 includes four individual feedback instances, including first feedback 1602 (e.g., at a timestamp 10:12 of lesson 1516) and second feedback 1604 (e.g., at a timestamp 28:10 of lesson 1516), described above, as well as a third feedback 1804 (e.g., at a timestamp 35:35 of lesson 1516) and a fourth feedback 1806 (e.g., at a timestamp 50:00 of lesson 1516). In this example, third feedback 1804 identifies an instance during the group presentation when second user 1508 was detected as being inattentive and fourth feedback 1806 identifies an instance during the group presentation when second user 1508 directly marked or flagged the portion of the group presentation.

Second summary 1810 of the feedback from fifth user 1514 includes four individual feedback instances, including a first feedback 1812 (e.g., at a timestamp 5:15 of lesson 1516), a second feedback 1814 (e.g., at a timestamp 31:44 of lesson 1516, a third feedback 1816 (e.g., at a timestamp 35:35 of lesson 1516), and feedback 1606, described above. In some embodiments, the feedback provided in feedback summaries 1800 may cover not only an instance during the group presentation, but also a duration or time period. For example, in some cases, the detected feedback may last for a length or period of time during the group presentation. As shown in FIG. 18, feedback 1606 spans a time period during lesson 1516 from a timestamp of 41:12 through a timestamp of 45:55. That is, during the group presentation, feedback 1606 from fifth user 1514 was detected to continue through the time period of more than four minutes. In this case, feedback 1606 indicates fifth user 1514 was inattentive during this time period.

In accordance with the example embodiments, upon completion of the group presentation (e.g., lesson 1516), second user 1508 may review first summary 1802 and/or fifth user 1514 may review second summary 1810 to determine which portions of the presentation or which subjects or topics may need additional review or tutoring. In some embodiments, feedback summaries 1800 may be provided to each user through their respective user interface 500. For example, in this embodiment, first summary 1802 may be displayed on display 1504 of user interface 500 for second user 1508 to review and second summary 1810 may be displayed on display 1504 of another user interface 500 for fifth user 1514 to review.

In an example embodiment, feedback summaries 1800 may also include an option for the user to select additional tutoring or review based on the identified feedback for the user. As shown in FIG. 18, first summary 1802 includes a tutoring option 1808 that may be selected by second user 1508 and second summary 1810 also includes a tutoring option 1818 that may be selected by fifth user 1514. In some embodiments, tutoring options 1808, 1818 may be self-directed review of specific topics or subjects from the group presentation where the user had feedback that indicates the user was confused, was not paying attention, or was directly marked or flagged for review by the user. For example, the user may access previously recorded presentations by the subject person or stored in avatar database 116 of system 100. In other embodiments, tutoring options 1808, 1810 may include personal sessions with the subject person to ask questions and review specific topics or subjects or may include interactive avatar sessions with an avatar of the subject person that is configured to engage with the user in an individual, one-on-one session to answer questions from the user and review specific topics or subjects.

Figure 19:
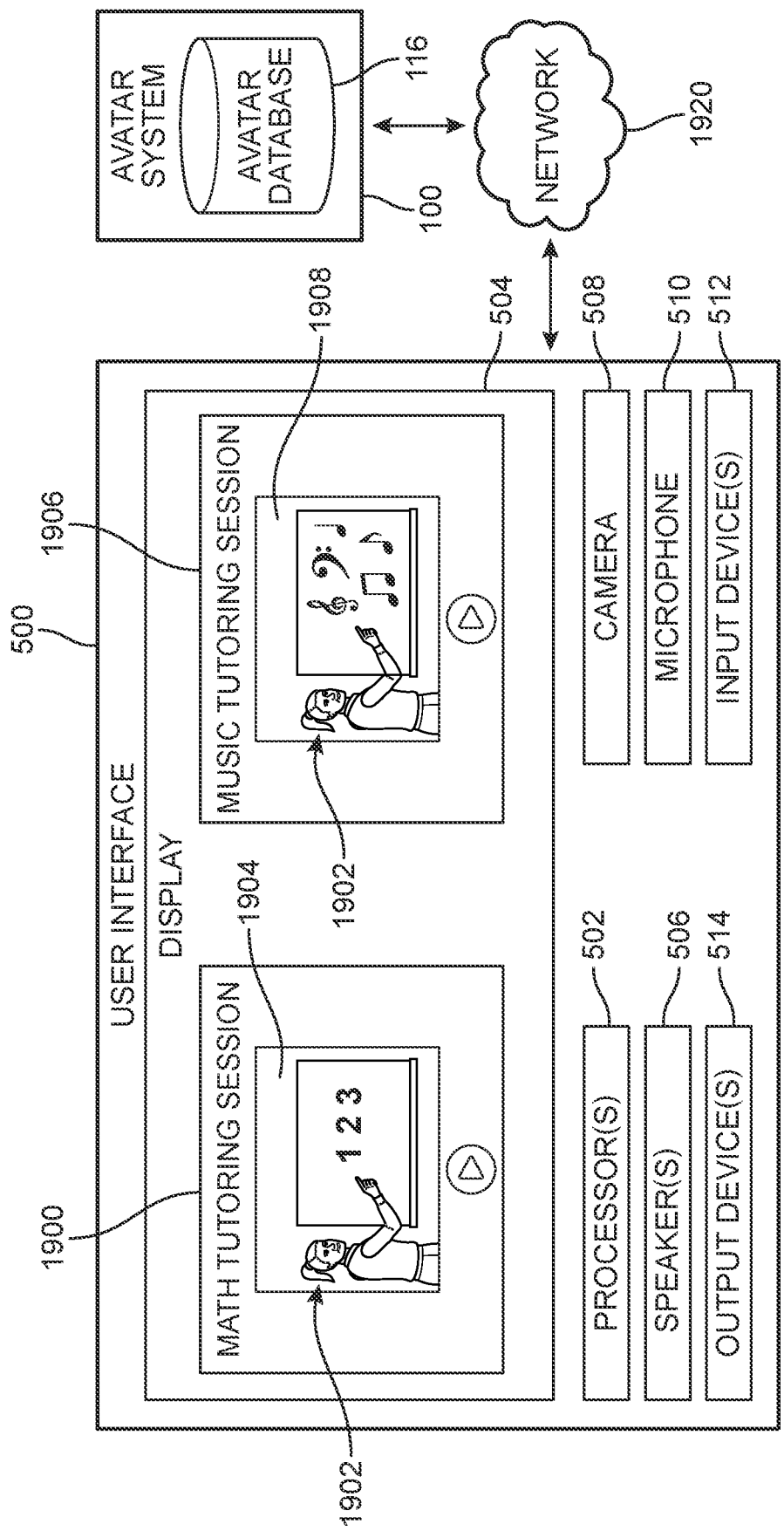
FIG. 19 is a representative view of an example embodiment of a user interface.

Referring now to FIG. 19, an example embodiment of user interface 500 is shown. In an example embodiment, user interface 500 provides a mechanism that allows a user to interact with one or more interactive avatars of subject persons and/or to engage with system 100, including accessing various settings and databases, including avatar database 116 and/or user database 118. User interface 500 may be embodied in hardware, software, or a combination of both hardware and software. In one embodiment, user interface 500 may be an application or software program that runs or executes on a computing device that communicates with system 100 via a network 1920.

In an example embodiment, user interface 500 may include at least one processor 502 and display 504. Display 504 may be used to display video associated with a group presentation, interactive avatars of subject persons, as well as information associated with the user in system 100. For example, display 504 of user interface 500 may feedback summaries 1800, including video or interactive avatar sessions for review subjects or topics from a group presentation or for tutoring via a live session with a subject person or an interactive session with an avatar of a subject person.

User interface 500 may also include one or more speakers 506 that are configured to output audio, including audio from the group presentation and/or interactive digital avatar of the subject person. In some embodiments, user interface 500 may also include components that allows a user to send or transmit audio and/or video to system 100, such as, for example, camera 508 configured to capture or record video and/or image information from the user and microphone 510 configured to capture or record audio information from the user. In some embodiments, user interface 500 may also include one or more other input devices 512 and/or one or more other output devices 514. With this arrangement, user interface 500 allows a user to interact with components of system 100.

In different embodiments, user interface 500 may take any one or more of a variety of different forms or devices. For example, as shown in FIG. 19, user interface 500 may be embodied in a computer on which the user may interact with components of avatar system 100 over network 1920. User interface 50 may also be embodied in a mobile device, such as a smartphone or tablet computer, a virtual reality (VR) or augmented reality (AR) headset, or any other devices or forms of user interface 500 may be provided to allow a subject person to interact with system 100.

As shown in FIG. 19, user interface 500 is displaying a first interactive tutoring session 1900 with an interactive avatar 1902 of a subject person to review or ask questions about a first subject or topic 1904. First subject or topic 1904 may have been a part of portion of a group presentation (e.g., lesson 1516, described above) that was identified in the user's feedback summary as having feedback from the user indicating the user was confused, distracted, had questions, or was marked or flagged by the user. For example, in this embodiment, first subject or topic 1904 is mathematics discussed during third portion 1522 of lesson 1516.

Similarly, a second interactive tutoring session 1906 with interactive avatar 1902 of the subject person to review or ask questions about a second subject or topic 1908. Second subject or topic 1908 may be a different subject or topic than first subject or topic 1904 and may also have been a part of portion of a group presentation (e.g., lesson 1516, described above) that was identified in the user's feedback summary as having feedback from the user indicating the user was confused, distracted, had questions, or was marked or flagged by the user. For example, in this embodiment, second subject or topic 1908 is music discussed during fourth portion 1524 of lesson 1516.

With this arrangement, upon completion of a group presentation (e.g., lesson 1516), a user can review and analyze their feedback from the presentation and choose to engage in an interactive avatar session to review or receiving tutoring on one or more subjects or topics discussed during the presentation.

Figure 20:
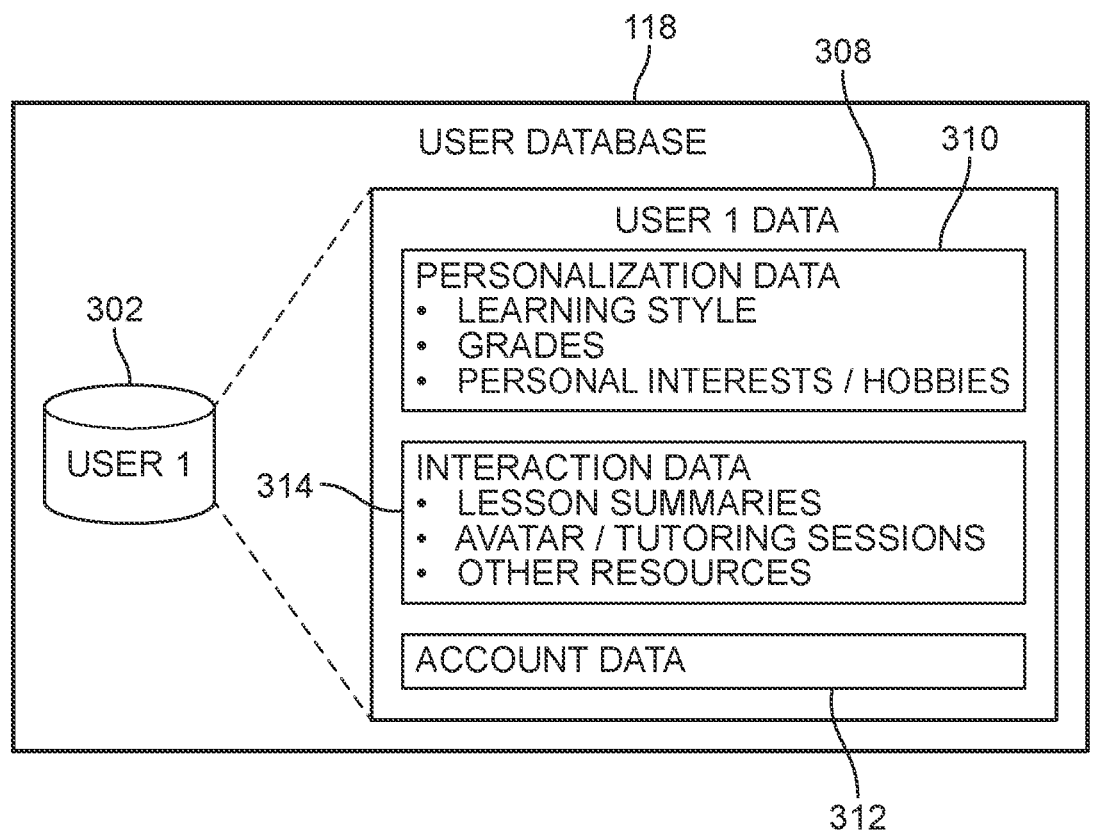
FIG. 20 is a detailed view of an example embodiment of a user database.

FIG. 20 is a detailed view of user database 118, described above. In an example embodiment, a user may interact with user database 118 via user interface 500. In this embodiment, a representative user file, for example, first data set 308 for first user 302 is shown in detail. For example, as shown in FIG. 20, first data set 308 for first user 302 includes personalization data 310, account data 312, and/or interaction data 314 associated with first user 302.

As described above, personalization data 310 can include various personal data or information associated with first user 302 so that AI engine 102 may use personalization data 310 to customize or personalize the interaction between a digital avatar and first user 302. For example, personalization data 310 may include the user's name, birthday, hair or eye color, names of family members, the user's preferences (e.g., nicknames, topics of conversation, greeting types, favorite subjects, etc.), and other information that can be used by AI engine 102 to personalize or customize interactions between the user and the digital avatar of the subject person. In addition, in some embodiments, personalization data 310 may further include information such as a learning style of the user (e.g., visual learning, auditory learning, reading/writing learning, kinesthetic learning, etc.), a history or summary of the user's grades or test scores, and information about the user's personal interests or hobbies.

In some cases, personalization data 310 may also include identification of any accommodations or learning disorders for the user, such as, whether the user should be granted extra time to complete lessons or tests, whether the user is dyslexic, has Attention Deficit Hyperactivity Disorder (ADHD), Autism Spectrum Disorder, anxiety issues, or other conditions that should be taken into account when personalizing lessons, presentations, interactive avatar sessions, or tutoring sessions with the user.

Interaction data 314 can include various information and data associated with one or more interactive avatar sessions between the user and one or more avatars of a subject person or subject persons. For example, interaction data 314 may include log files or other captured transcripts of conversations between the user and the avatar, including dates, times, duration of the interaction, topics discussed, etc. Interaction data 314 may also include one or more feedback summaries for the user from various lessons (e.g., feedback summaries 1800 for lesson 1516), information about interactive avatar sessions or tutoring sessions conducted by the user, as well as other resources, such as recorded presentations or lectures or other study materials accessed or reviewed by the user.

The information or data included in interaction data 314 may be used by system 100 to improve the personalization or customization of the interaction between the user and the digital avatar of the subject person. For example, information or data included in interaction data 314 obtained from an interactive session with a digital avatar (such as a user describing favorite colors or foods, or referring to family members by name or relationship) may be added to personalization data 310 in first data set 308 for first user 302 to be used by AI engine 102 in subsequent interactive sessions with a digital avatar to provide personalized or customized interactions with the user.

Additionally, as described above, account data 312 can include account identifiers, such as user names and passwords or account numbers, billing and payment information for the user, including payment types (e.g., credit cards or cryptocurrency), billing addresses, subscription or account plan information, etc. In some embodiments, account data 312 may also include the name and contact information for a parent or guardian of the user, for example, in cases where the user is minor child.

In an example embodiment, information in user database 118 associated with a user may be used by system 100 to customize or personalize interactive avatar sessions and/or tutoring sessions with a live subject person or an avatar of the subject person. For example, any of personalization data 310, interaction data 314, and/or account data 312 may be used by system 100 to generate a customized interactive avatar session and/or tutoring session that is specifically tailored for the user. That is, rather than a general, one size fits all approach, the system 100 of the present embodiments allows interactive avatar sessions and/or tutoring sessions to be conducted with the user that optimize the opportunities for learning. For example, information in user database 118 may be used to adapt or modify an interactive avatar session and/or tutoring session to a user's learning style, personal interests or hobbies, and/or to take into account any accommodations or conditions of the user that may affect how they learn.

Figure 21:
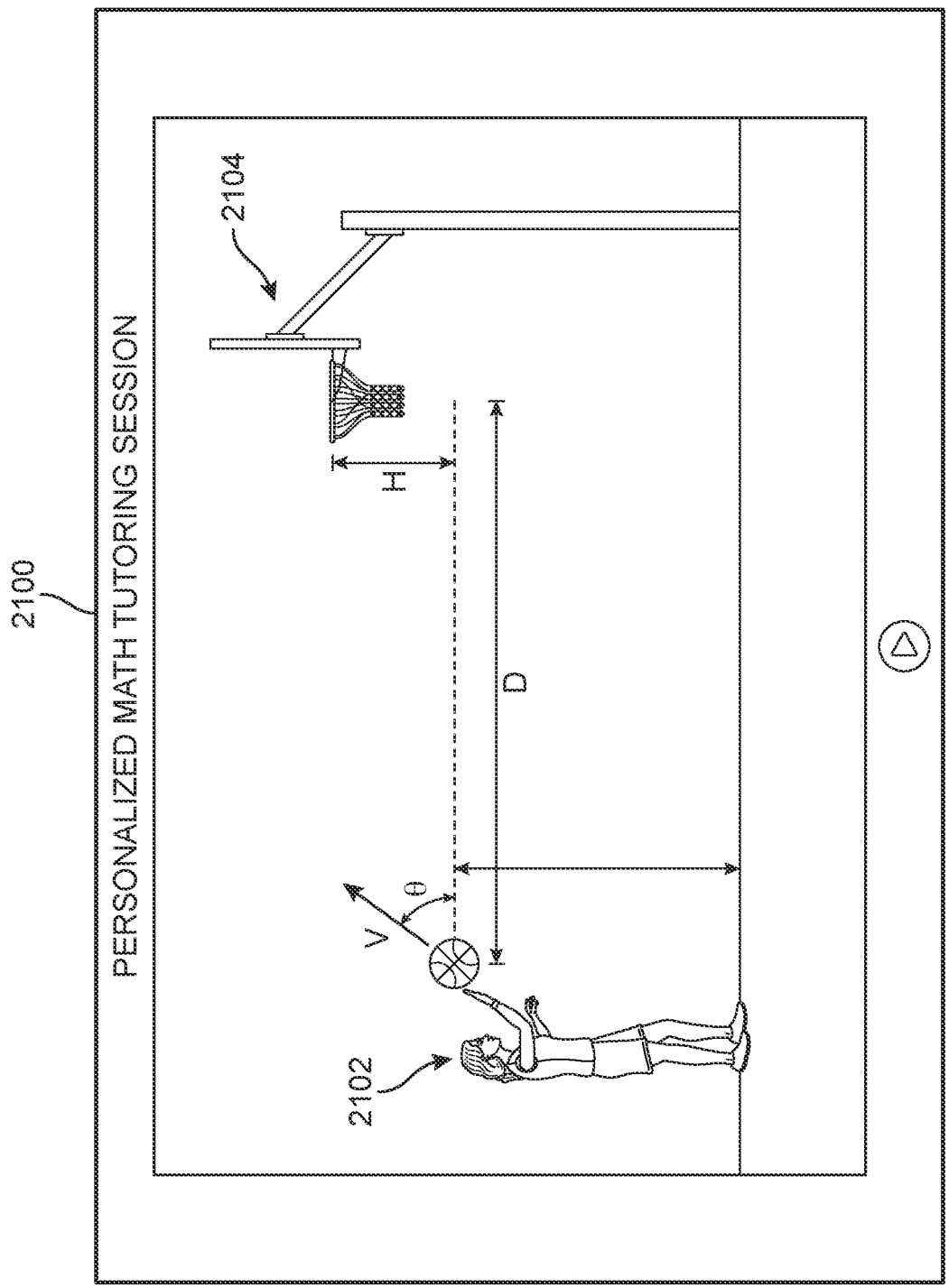
FIG. 21 is a representative view of an example embodiment of a personalized tutoring session generated based on the user's feedback during a group presentation.

Referring now to FIG. 21, an example embodiment of a personalized tutoring session 2100 generated based on a user's feedback during a group presentation is shown. In some embodiments, personalized tutoring session 2100 may be provided as an option to a user through user interface 500 upon completion of a group discussion. In an example embodiment, personalized tutoring session 2100 may be generated based on the user's feedback collected during the group presentation, for example, first summary 1802 of the feedback from second user 1508 during lesson 1516, described above.

In this embodiment, first summary 1802 of the feedback from second user 1508 indicates that second user 1508 was confused and inattentive during third portion 1522 of lesson 1516 discussing mathematics (e.g., feedback 1604, 1804). According to the techniques of the present embodiments, this feedback detected for second user 1508 may be used by system 100 to generate personalized tutoring session 2100 in the form of a personalized math tutoring session to address the feedback from second user 1508 indicating they were confused and inattentive during that portion of the presentation.

As shown in FIG. 21, system 100 generates personalized tutoring session 2100 that includes an interactive avatar 2102 of a subject person (e.g., an avatar of subject person 1502 featured in lesson 1516) from the presentation that is customized or personalized for the user (e.g., second user 1508). Additionally, in some embodiments, personalized tutoring session 2100 may be further customized or personalized based on information associated with the user in user database 118, including any of the information described above.

In some embodiments, personalized tutoring session 2100 may be customized using information about a user's personal interests or hobbies to make the tutoring session more engaging to the user and to increase participation and/or learning by the user. For example, in this embodiment, personalized tutoring session 2100 has been customized by modifying or adapting the tutoring session to reflect a user's interest in basketball. As a result, personalized tutoring session 2100 shows interactive avatar 2102 shooting a basketball at a basketball hoop in order to demonstrate an example of a mathematics equation 2104. Other interactive avatar sessions and/or tutoring sessions may be similarly customized or personalized to take into account any of the information associated with the user in user database 118, including, but not limited to any of the information described above in reference to personalization data 310, account data 312, and/or interaction data 314. With this arrangement, interactive avatar sessions and/or tutoring sessions conducted with the user through system 100 can optimize opportunities for learning.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method of providing an interactive digital avatar of a subject person during a tutoring session to a user, the method comprising:
   transmitting a video of a group presentation featuring a subject person to a plurality of users via a first communication format;

detecting from a user interface of at least one user of the plurality of users during the group presentation, feedback from the at least one user during the group presentation;

wherein detecting the feedback from the at least one user during the group presentation comprises capturing an input made by the at least one user during the group presentation through the user interface that includes one of a gesture, a facial expression, or body language made by the at least one user;

upon completion of the group presentation, providing a feedback summary of the detected feedback from the at least one user to the at least one user via the user interface;

generating a tutoring session between the at least one user and an interactive avatar of the subject person, wherein the tutoring session is based on the feedback summary of the at least one user;

wherein the tutoring session is conducted via a second communication format that is different than the first communication format;

wherein the group presentation includes two or more portions, each portion being associated with a different topic or subject; and wherein the feedback summary includes a timestamp corresponding to each portion of the two or more portions of the group presentation when the feedback was detected.

2. The method according to claim 1, wherein the tutoring session is directed to a topic or subject discussed during at least one portion of the two or more portions of the group presentation.

3. The method according to claim 1, wherein the tutoring session is personalized using information about the at least one user stored in a user database.

4. The method according to claim 3, wherein the information about the at least one user stored in the user database comprises personalization data and interaction data.

5. The method according to claim 4, wherein the interaction data includes one or more previous interactive avatar sessions between the at least one user and an avatar of a subject person.

6. The method according to claim 4, wherein the personalization data includes at least one of a learning style or a personal interest of the at least one user.

7. The method according to claim 6, wherein the at least one of the learning style or the personal interest is used to customize the tutoring session between the at least one user and the interactive avatar of the subject person.

8. A system for providing an interactive digital avatar of a subject person during a tutoring session to a user, the system comprising:

a communication interface allowing communication with a plurality of users;

an artificial intelligence engine in communication with the communication interface, the artificial intelligence engine including at least one processor, a memory, and storage for computer-readable instructions that, when executed by the at least one processer, cause the at least one processor to:

transmit, via the communication interface, a group presentation featuring a subject person to the plurality of users via a first communication format;

detect from a user interface of at least one user of the plurality of users during the group presentation, feedback from the at least one user during the group presentation;

wherein detecting the feedback from the at least one user during the group presentation comprises capturing an input made by the at least one user during the group presentation through the user interface that includes one of a gesture, a facial expression, or body language made by the at least one user;

upon completion of the group presentation, provide a feedback summary of the detected feedback from the at least one user to the at least one user via the user interface;

generate a tutoring session between the at least one user and an interactive avatar of the subject person, wherein the tutoring session is based on the feedback summary of the at least one user;

wherein the tutoring session is conducted via a second communication format that is different than the first communication format;

wherein the group presentation includes two or more portions, each portion being associated with a different topic or subject; and wherein the feedback summary includes a timestamp corresponding to each portion of the two or more portions of the group presentation when the feedback was detected.

9. The system according to claim 8, further comprising a user database, the user database including information about the at least one user; and wherein the at least one processor is further configured to customize the tutoring session between the at least one user and the interactive avatar of the subject person using the information in the user database.

10. The system according to claim 9, wherein the information about the at least one user stored in the user database comprises personalization data and interaction data.

11. The system according to claim 10, wherein the personalization data includes at least one of a learning style or a personal interest of the at least one user.

12. The system according to claim 11, wherein the at least one of the learning style or the personal interest is used to customize the tutoring session between the at least one user and the interactive avatar of the subject person.

13. The method according to claim 1, wherein the feedback comprises direct feedback associated with an input from the at least one user detected from one of a microphone, a keyboard, a mouse, or a touchscreen.

14. The method according to claim 1, wherein the feedback comprises indirect feedback captured by a camera of the user interface.

15. The system according to claim 8, wherein the feedback comprises direct feedback associated with an input from the at least one user detected from one of a microphone, a keyboard, a mouse, or a touchscreen.

16. The system according to claim 8, wherein the feedback comprises indirect feedback captured by a camera of the user interface.

* * * * *